(12) United States Patent
Igarashi et al.

(10) Patent No.: US 10,497,149 B2
(45) Date of Patent: Dec. 3, 2019

(54) IMAGE PROCESSING APPARATUS AND IMAGE PROCESSING METHOD

(71) Applicant: RENESAS ELECTRONICS CORPORATION, Tokyo (JP)

(72) Inventors: Ryuichi Igarashi, Tokyo (JP); Seiji Mochizuki, Tokyo (JP); Katsushige Matsubara, Tokyo (JP); Toshiyuki Kaya, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 158 days.

(21) Appl. No.: 15/861,164

(22) Filed: Jan. 3, 2018

(65) Prior Publication Data
US 2018/0276850 A1    Sep. 27, 2018

(30) Foreign Application Priority Data

Mar. 27, 2017  (JP) .................. 2017-061110

(51) Int. Cl.
*G06T 3/40* (2006.01)
*G06T 7/00* (2017.01)
*G06T 7/55* (2017.01)
*G06T 5/50* (2006.01)

(52) U.S. Cl.
CPC .............. *G06T 7/97* (2017.01); *G06T 3/4092* (2013.01); *G06T 5/50* (2013.01); *G06T 7/55* (2017.01)

(58) Field of Classification Search
CPC ....... G06T 3/40; G06T 3/4038; G06T 3/4092; G06T 7/97; G06T 2200/32; G09G 2304/04; G09G 2340/0407; G09G 2340/0414; G09G 2340/0421; G09G 2340/0442; G09G 2340/145
See application file for complete search history.

(56) References Cited

U.S. PATENT DOCUMENTS

| | | | |
|---|---|---|---|
| 2010/0020236 A1* | 1/2010 | Lien .......................... | G06T 3/40 348/555 |
| 2013/0328878 A1* | 12/2013 | Stahl et al. ........... | G06F 3/1431 345/428 |
| 2016/0267627 A1* | 9/2016 | Nakai .................. | G09G 3/3406 |

FOREIGN PATENT DOCUMENTS

JP    2011-033978 A    2/2011

* cited by examiner

*Primary Examiner* — Andrew W Johns
(74) *Attorney, Agent, or Firm* — McDermott Will & Emery LLP

(57) ABSTRACT

An image processing apparatus according to one embodiment determines target resolutions of a plurality of source images based on a first horizontal direction size and a first vertical direction size which are a horizontal direction size and a vertical direction size of a backlight control unit of a first display, and a second horizontal direction size and a second vertical direction size which are a horizontal direction size and a vertical direction size of a backlight control unit of a second display, and converts the resolution of each of a plurality of source images such that the resolution of each of a plurality of source images becomes the target resolution.

14 Claims, 12 Drawing Sheets

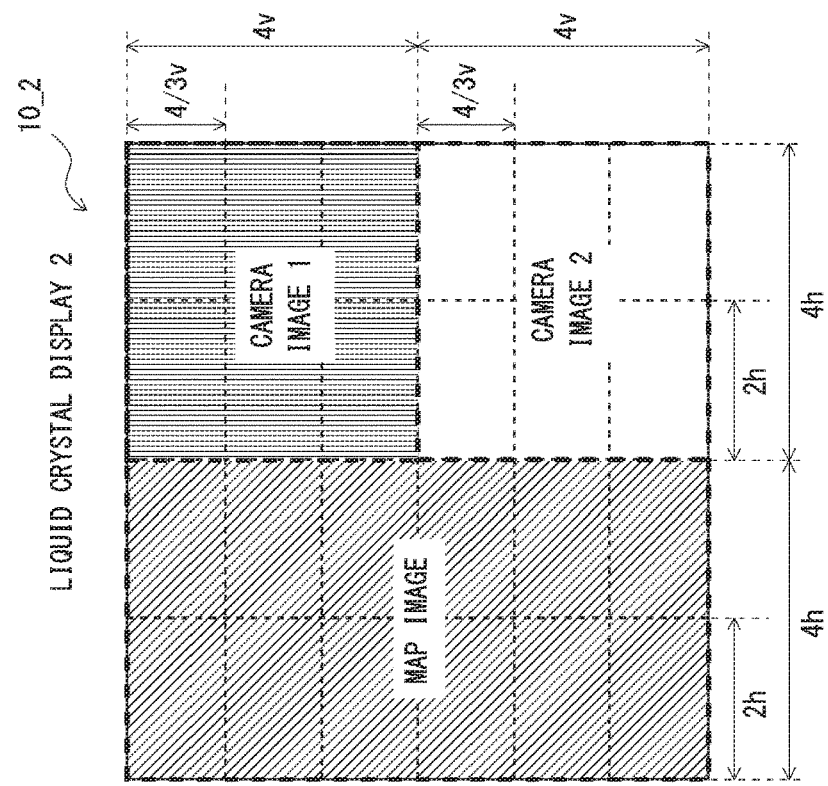
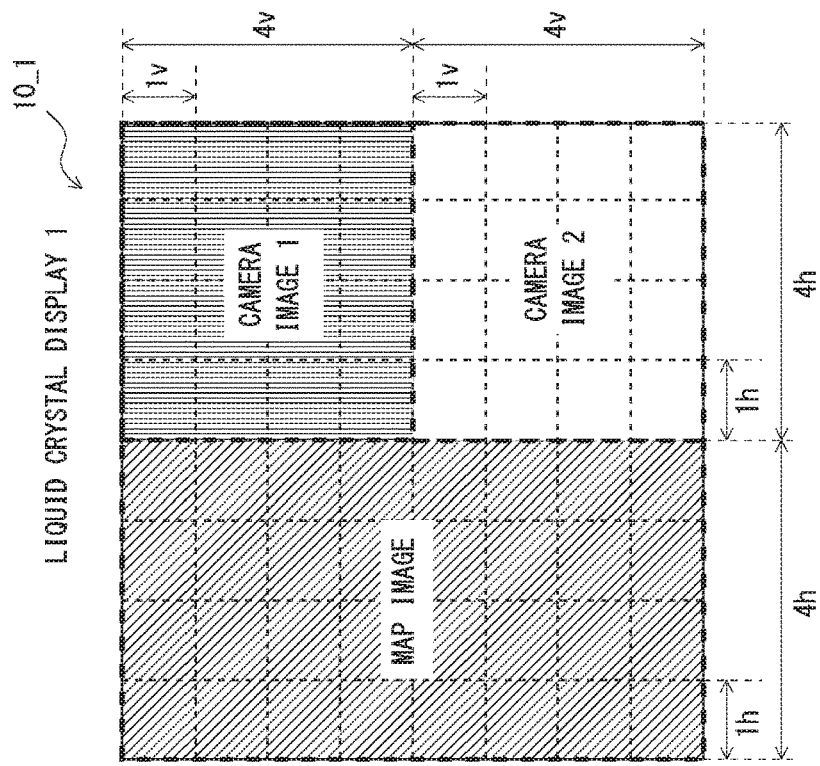
Fig. 2

ABSTRACT

IMAGE PROCESSING APPARATUS AND IMAGE PROCESSING METHOD

CROSS-REFERENCE TO RELATED APPLICATIONS

This application is based upon and claims the benefit of priority from Japanese patent application No. 2017-061110, filed on Mar. 27, 2017, the disclosure of which is incorporated herein in its entirety by reference.

BACKGROUND

1. Field of the Invention

The present invention relates to an image processing apparatus and an image processing method. More particularly, the present invention relates to, for example, the image processing apparatus and the image processing method which display images on a plurality of displays.

2. Description of Related Art

One of techniques of reducing power consumption of liquid crystal displays is a local dimming technique. The local dimming technique is a technique of dividing a liquid crystal display into a plurality of areas, and controlling a backlight of the liquid crystal display according to a luminance of input image data per divided area.

Japanese Unexamined Patent Application Publication No. 2011-33978 discloses a technique of dividing an entire display screen area into a plurality of display sections, limiting an image display area to a smaller reduced display area than the entire display screen area and thereby reducing power consumption of a backlight.

SUMMARY

As described with reference to the related art, the local dimming control divides a display into a plurality of areas, and controls a backlight per divided area. However, displaying the same source image on a plurality of displays causes the following problem.

That is, when backlight control units during local dimming control are different between a plurality of displays, and when the same source image is displayed on each display, it is not possible to appropriately control the backlight per area. Therefore, there is a problem that it is not possible to perform appropriate local dimming control.

Other tasks and new features will be more apparent from the description and the accompanying drawings of the description.

According to one embodiment, an image processing apparatus is configured to determine target resolutions of a plurality of source images based on a first horizontal direction size and a first vertical direction size that are a horizontal direction size and a vertical direction size of the control unit of a backlight of a first display, and a second horizontal direction size and a second vertical direction size that are a horizontal direction size and a vertical direction size of the control unit of the backlight of the second display, and convert the resolution of each of a plurality of source images such that the resolution of each of a plurality of source images becomes the target resolution.

According to one embodiment, it is possible to provide an image processing apparatus and an image processing method which, when displaying the same source image on a plurality of displays, processes source images so as to enable appropriate local dimming control.

BRIEF DESCRIPTION OF THE DRAWINGS

The above and other aspects, advantages and features will be more apparent from the following description of certain embodiments taken in conjunction with the accompanying drawings, in which:

FIG. 2 is a view illustrating an example of a state where source images processed by using the image processing apparatus according to the first embodiment are displayed on a liquid crystal display;

DETAILED DESCRIPTION

First Embodiment

The first embodiment will be described below with reference to the drawings.

Figure 1:
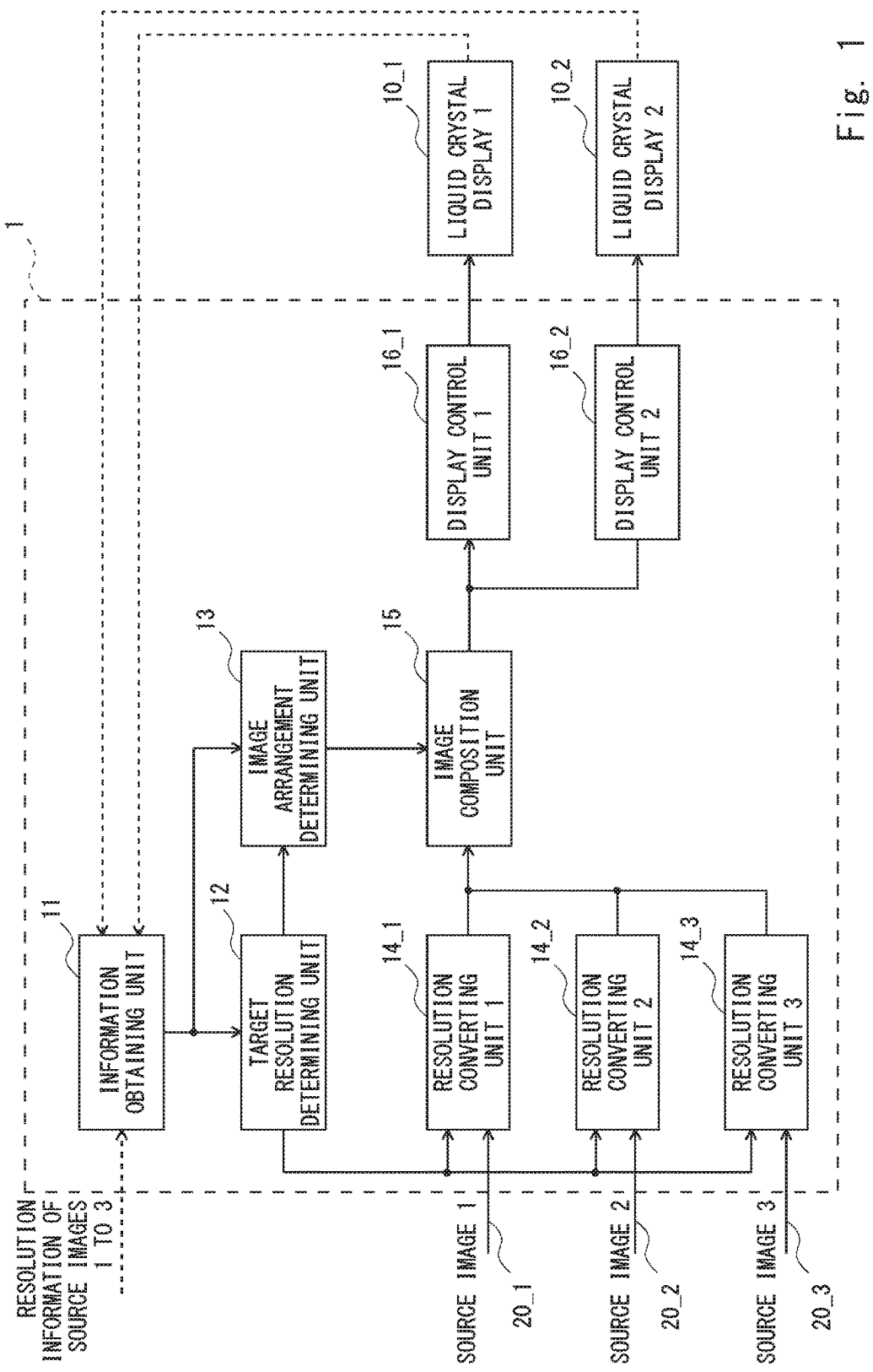
FIG. 1 is a block diagram illustrating an image processing apparatus according to a first embodiment.

FIG. 1 is a block diagram illustrating an image processing apparatus according to the first embodiment. As illustrated in FIG. 1, an image processing apparatus 1 includes an information obtaining unit 11, a target resolution determining unit 12, an image arrangement determining unit 13, resolution converting units 14_1 to 14_3, an image composition unit 15 and display control units 16_1 and 16_2. Image data processed by the image processing apparatus 1 is supplied to the liquid crystal displays 10_1 and 10_2. In this regard, a case where the image processing apparatus according to the present embodiment is applied to a liquid crystal display will be described below as an example.

However, the image processing apparatus according to the present embodiment is applicable to displays other than the liquid crystal display, too.

The image processing apparatus 1 according to the present embodiment can be mounted on, for example, an in-vehicle SOC (System on a Chip). For example, the in-vehicle SOC is used to display the same image on a plurality of liquid crystal displays. A plurality of these liquid crystal displays have different backlight control units during local dimming control. The image processing apparatus 1 according to the present embodiment can be suitably used for image processing of displaying an image obtained by synthesizing a plurality of source images 20_1 to 20_3 on a plurality of liquid crystal displays 10_1 and 10_2 of different backlight control units during local dimming control.

FIG. 1 illustrates a configuration example where the three source images 20_1 to 20_3 are supplied to the image processing apparatus 1. However, the number of source images supplied to the image processing apparatus 1 may be plural and is not limited in particular. FIG. 1 illustrates a configuration example where the image processing apparatus 1 controls the two liquid crystal displays 10_1 and 10_2. However, the number of liquid crystal displays controlled by the image processing apparatus 1 may be plural and is not limited in particular.

The liquid crystal displays 10_1 and 10_2 display image data outputted from the display control units 16_1 and 16_2. The image data outputted from the display control unit 16_1 and the image data outputted from the display control unit 16_2 are the same image data, and are the image data obtained by synthesizing a plurality of source images 20_1 to 20_3. In the present embodiment, the liquid crystal displays 10_1 and 10_2 have the same screen resolution. Further, the liquid crystal displays 10_1 and 10_2 are configured to enable local dimming control. However, the backlight control units during the local dimming control of the liquid crystal display 10_1 and 10_2 are different. When, for example, models of the liquid crystal displays 10_1 and 10_2 are different, the backlight control units during the local dimming control are different.

FIG. 2 is a view illustrating an example of a state where the source images 20_1 to 20_3 processed by using the image processing apparatus according to the present embodiment are displayed on the liquid crystal displays. As illustrated in FIG. 2, the liquid crystal displays 10_1 and 10_2 display the same image. That is, the liquid crystal displays 10_1 and 10_2 display the image obtained by synthesizing a camera image 1 (source image 20_1), a camera image 2 (source image 20_2) and a map image (source image 20_3).

Further, as shown in FIG. 2, each of the liquid crystal displays 10_1 and 10_2 has the same screen resolution (horizontal direction 8h×horizontal direction 8v: simply described as 8h×8v below). Meanwhile, the backlight control units during the local dimming control of the liquid crystal displays 10_1 and 10_2 are different. In the example illustrated in FIG. 2, a horizontal direction size of the backlight control unit during the local dimming control of the liquid crystal display 10_1 is 1h, and the vertical direction size is 1v. Meanwhile, the horizontal direction size of the backlight control unit during the local dimming control of the liquid crystal display 10_2 is 2h, and the vertical direction size is 4/3v.

The information obtaining unit 11 of the image processing apparatus 1 illustrated in FIG. 1 obtains a screen resolution of each of the liquid crystal displays 10_1 and 10_2. Further, the information obtaining unit 11 obtains the horizontal direction size (first horizontal direction size) and the vertical direction size (first vertical direction size) of the backlight control unit of the liquid crystal display 10_1. Furthermore, the information obtaining unit 11 obtains a horizontal direction size (second horizontal direction size) and a vertical direction size (second vertical direction size) of the backlight control unit of the liquid crystal display 10_2.

More specifically describing with reference to FIG. 2, the information obtaining unit 11 obtains the screen resolution (8h×8v) of each of the liquid crystal displays 10_1 and 10_2. Further, the information obtaining unit 11 obtains "1h" which is the horizontal direction size and "1v" which is the vertical direction size of the backlight control unit of the liquid crystal display 10_1. Furthermore, the information obtaining unit 11 obtains "2h" which is the horizontal direction size and "4/3v" which is the vertical direction size of the backlight control unit of the liquid crystal display 10_2.

In this regard, the horizontal direction size and the vertical direction size of the backlight control units of the liquid crystal displays 10_1 and 10_2 will be also abbreviated and described as a "BL unit horizontal size" and a "BL unit vertical size", respectively.

As shown in FIG. 1, the information obtaining unit 11 can obtain the screen resolution, the BL unit horizontal size and the BL unit vertical size of each of the liquid crystal displays 10_1 and 10_2 from the liquid crystal displays 10_1 and 10_2. Further, when, for example, the screen resolution, the BL unit horizontal size and the BL unit vertical size are stored as setting information in advance in a register (not illustrated), the information obtaining unit 11 can obtain the screen resolution, the BL unit horizontal size and the BL unit vertical size from the register (not illustrated).

Furthermore, the information obtaining unit 11 obtains information related to the resolution of each of a plurality of source images 20_1 to 20_3. For example, the information obtaining unit 11 may directly receive an input of a plurality of source images 20_1 to 20_3, and obtain information related to the resolution from the image data of the inputted source images 20_1 to 20_3. Further, the information obtaining unit 11 may obtain information related to each resolution from an apparatus (not illustrated) which outputs each of the source images 20_1 to 20_3. Information related to the screen resolution, the BL unit horizontal size and the BL unit vertical size of each of the liquid crystal display 10_1 and 10_2 obtained by the information obtaining unit 11 is supplied to the target resolution determining unit 12 and the image arrangement determining unit 13. Further, information related to the resolution of each of the source images 20_1 to 20_3 obtained by the information obtaining unit 11 is supplied to the target resolution determining unit 12.

The target resolution determining unit 12 determines a target resolution of each of the source images 20_1 to 20_3 based on the BL unit horizontal size and the BL unit vertical size of each of the liquid crystal displays 10_1 and 10_2 supplied from the information obtaining unit 11, and the information related to the resolution of each of the source images 20_1 to 20_3. In other words, the target resolution determining unit 12 determines the resolution of each source image converted by each of the resolution converting units 14_1 to 14_3. For example, the target resolution may be a horizontal direction conversion scale factor (horizontal scale factor) and a vertical direction conversion scale factor (vertical scale factor) of each of the resolution converting units 14_1 to 14_3.

In this case, the target resolution determining unit 12 determines a target resolution in a horizontal direction of each of the source images 20_1 to 20_3 such that the resolution in the horizontal direction of each of a plurality of source images 20_1 to 20_3 becomes a common multiple of the BL unit horizontal size of the liquid crystal display 10_1 and the BL unit horizontal size of the liquid crystal display 10_2. Similarly, the target resolution determining unit 12 determines a target resolution in a vertical direction of each of the source images 20_1 to 20_3 such that the resolution in the vertical direction of each of a plurality of source images 20_1 to 20_3 becomes a common multiple of the BL unit vertical size of the liquid crystal display 10_1 and the BL unit vertical size of the liquid crystal display 10_2.

More specifically describing with reference to FIG. 2, the target resolution determining unit 12 determines the target resolution in the horizontal direction of each of the source images 20_1 to 20_3 such that the resolution in the horizontal direction of each of a plurality of source images 20_1 to 20_3 becomes the common multiple of "1h" which is the BL unit horizontal size of the liquid crystal display 10_1 and "2h" which is the BL unit horizontal size of the liquid crystal display 10_2. In other words, the target resolution determining unit 12 determines the target resolution in the horizontal direction of each of the source images 20_1 to 20_3 such that the resolution becomes an integer multiple of "2h" which is the least common multiple of "1h" which is the BL unit horizontal size of the liquid crystal display 10_1 and "2h" which is the BL unit horizontal size of the liquid crystal display 10_2.

Further, the target resolution determining unit 12 determines the target resolution in the vertical direction of each of the source images 20_1 to 20_3 such that the resolution in the vertical direction of each of a plurality of source images 20_1 to 20_3 becomes the common multiple of "1v" which is the BL unit horizontal vertical of the liquid crystal display 10_1 and "4/3v" which is the BL unit vertical size of the liquid crystal display 10_2. In other words, the target resolution determining unit 12 determines the target resolution in the vertical direction of each of the source images 20_1 to 20_3 such that the resolution becomes an integer multiple of "4v" which is the least common multiple of "1v" which is the BL unit vertical size of the liquid crystal display 10_1 and "4/3v" which is the BL unit vertical size of the liquid crystal display 10_2.

In the example illustrated in FIG. 2, the target resolution determining unit 12 determines the target resolution of each of the source images 20_1 to 20_3 such that the resolution of the camera image 1 (source image 20_1) becomes 4h×4v, the resolution of the camera image 2 (source image 20_2) becomes 4h×4v and the resolution of the map image (source image 20_3) becomes 4h×8v.

The target resolution of each of the source images 20_1 to 20_3 determined by the target resolution determining unit 12 is supplied to the resolution converting units 14_1 to 14_3 and the image arrangement determining unit 13.

The image arrangement determining unit 13 determines an arrangement of each of the source images 20_1 to 20_3 displayed on the liquid crystal displays 10_1 and 10_2 based on the information related to the screen resolution, the BL unit horizontal size and the BL unit vertical size of each of the liquid crystal displays 10_1 and 10_2 supplied from the information obtaining unit 11, and the target resolution of each of the source images 20_1 to 20_3 supplied from the target resolution determining unit 12.

More specifically, the image arrangement determining unit 13 determines an arrangement of each source image such that a boundary in the horizontal direction of each source image after the resolution is converted is at a position corresponding to the common multiple of the BL unit horizontal size of the liquid crystal display 10_1 and the BL unit horizontal size of the liquid crystal display 10_2. Further, the image arrangement determining unit 13 determines an arrangement of each source image such that a boundary in the vertical direction of each source image after the resolution is converted is at a position corresponding to the common multiple of the BL unit vertical size of the liquid crystal display 10_1 and the BL unit vertical size of the liquid crystal display 10_2.

In other words, the image arrangement determining unit 13 determines the arrangement of each source image such that the boundary in the horizontal direction of each source image after the resolution is converted is at a position of the integer multiple of the least common multiple of the BL unit horizontal size of the liquid crystal display 10_1 and the BL unit horizontal size of the liquid crystal display 10_2. Further, the image arrangement determining unit 13 determines the arrangement of each source image such that the boundary in the vertical direction of each source image after the resolution is converted is at the position of the integer multiple of the least common multiple of the BL unit vertical size of the liquid crystal display 10_1 and the BL unit vertical size of the liquid crystal display 10_2.

Further, the image arrangement determining unit 13 determines the arrangement of each source image such that each source image after the resolution is converted is arranged within a range of the screen resolution of each of the liquid crystal displays 10_1 and 10_2.

In the example illustrated in FIG. 2, when an upper left position of each of the liquid crystal displays 10_1 and 10_2 is 0×0 (horizontal direction×vertical direction), the image arrangement determining unit 13 arranges the map image (source image 20_3) from a position of 0×0, arranges the camera image 1 (source image 20_1) from a position of 4h×0, and arranges the camera image 2 (source image 20_2) from a position of 4h×4v.

The image arrangement determining unit 13 outputs information related to the determined arrangement of each of the source images 20_1 to 20_3 to the image composition unit 15.

Each of the resolution converting units 14_1 to 14_3 converts the resolution of each of the source images 20_1 to 20_3 such that the resolution of each of the inputted source images 20_1 to 20_3 becomes the target resolution determined by the target resolution determining unit 12. Each source image converted by each of the resolution converting units 14_1 to 14_3 is supplied to the image composition unit 15.

The image composition unit 15 synthesizes each source image converted by each of the resolution converting units 14_1 to 14_3 such that the arrangement of each source image becomes the arrangement determined by the image arrangement determining unit 13. The image data synthesized by the image composition unit 15 is supplied to the display control units 16_1 and 16_2.

Each of the display control units 16_1 and 16_2 displays the image data supplied from the composition unit 15, on each of the liquid crystal displays 10_1 and 10_2. In this case, each of the display control units 16_1 and 16_2 performs γ correction and color adjustment on each of the liquid crystal displays 10_1 and 10_2. Further, each of the display control units 16_1 and 16_2 performs local dimming control of adjusting a backlight luminance according to the images (the camera image 1, the camera image 2 and the map image) displayed on each of the liquid crystal displays 10_1 and 10_2. For example, each of the display control units 16_1 and 16_2 can perform local dimming control by analyzing a pixel value of the image data supplied from the image composition unit 15, and adjusting the backlight luminance within a range of 0% to 100% according to an analysis result.

As illustrated in FIG. 2, the liquid crystal displays 10_1 and 10_2 display the images (the camera image 1, the camera image 2 and the map image) obtained by synthesizing each of the source images 20_1 to 20_3. The liquid crystal display 10_1 performs the local dimming control by controlling the backlight per backlight minimum control unit (1h×1v) of the liquid crystal display 10_1. The liquid crystal display 10_2 performs the local dimming control by controlling the backlight per backlight minimum control unit (2h×4/3v) of the liquid crystal display 10_2.

Next, an operation (image processing method) of the image processing apparatus 1 illustrated in FIG. 1 will be described.

The information obtaining unit 11 obtains the information related to the screen resolution, the BL unit horizontal size and the BL unit vertical size of each of the liquid crystal displays 10_1 and 10_2 in advance. The information obtaining unit 11 can directly obtain the information related to the screen resolution, the BL unit horizontal size, and the BL unit vertical size from each of the liquid crystal displays 10_1 and 10_2. Further, when, for example, the screen resolution, the BL unit horizontal size and the BL unit vertical size are stored as the setting information in advance in the register (not illustrated), the information obtaining unit 11 can obtain the screen resolution, the BL unit horizontal size and the BL unit vertical size in advance from the register (not illustrated).

Furthermore, the information obtaining unit 11 obtains the information related to the resolution of each of a plurality of source images 20_1 to 20_3. For example, the information obtaining unit 11 may directly receive an input of a plurality of source images 20_1 to 20_3, and obtain the information related to the resolution of each of the inputted source images 20_1 to 20_3. Further, the information obtaining unit 11 may obtain the information related to each resolution from the apparatus (not illustrated) which outputs each of the source images 20_1 to 20_3.

Subsequently, the target resolution determining unit 12 determines the target resolution of each of source images 20_1 to 20_3 based on the BL unit horizontal size and the BL unit vertical size of each of the liquid crystal displays 10_1 and 10_2 and the information related to the resolution of each of the source images 20_1 to 20_3 obtained by the information obtaining unit 11.

In this case, the target resolution determining unit 12 determines the target resolution in the horizontal direction of each of the source images 20_1 to 20_3 such that the resolution in the horizontal direction of each of a plurality of source images 20_1 to 20_3 becomes the common multiple of the BL unit horizontal size of the liquid crystal display 10_1 and the BL unit horizontal size of the liquid crystal display 10_2. Similarly, the target resolution determining unit 12 determines the target resolution in the vertical direction of each of the source images 20_1 to 20_3 such that the resolution in the vertical direction of each of a plurality of source images 20_1 to 20_3 becomes the common multiple of the BL unit vertical size of the liquid crystal display 10_1 and the BL unit vertical size of the liquid crystal display 10_2.

The target resolution of each of the source images 20_1 to 20_3 determined by the target resolution determining unit 12 is supplied to the resolution converting units 14_1 to 14_3 and the image arrangement determining unit 13.

The image arrangement determining unit 13 determines the arrangement of each of the source images 20_1 to 20_3 displayed on the liquid crystal displays 10_1 and 10_2 based on the information related to the screen resolution, the BL unit horizontal size and the BL unit vertical size of each of the liquid crystal displays 10_1 and 10_2 supplied from the information obtaining unit 11, and the target resolution of each of the source images 20_1 to 20_3 supplied from the target resolution determining unit 12, and outputs information related to the determined arrangement of each of the source images 20_1 to 20_3 to the image composition unit 15.

In this case, the image arrangement determining unit 13 determines the arrangement of each source image such that the boundary in the horizontal direction of each source image after the resolution is converted is at a position corresponding to the common multiple of the BL unit horizontal size of the liquid crystal display 10_1 and the BL unit horizontal size of the liquid crystal display 10_2. Further, the image arrangement determining unit 13 determines the arrangement of each source image such that the boundary in the vertical direction of each source image after the resolution is converted is at the position corresponding to the common multiple of the BL unit vertical size of the liquid crystal display 10_1 and the BL unit vertical size of the liquid crystal display 10_2. Furthermore, the image arrangement determining unit 13 determines the arrangement of each source image such that each source image after the resolution is converted is arranged within a range of the screen resolution of each of the liquid crystal displays 10_1 and 10_2.

Subsequently, when each of the source images 20_1 to 20_3 is supplied to each of the resolution converting units 14_1 to 14_3, each of the resolution converting units 14_1 to 14_3 converts the resolution of each of the source images 20_1 to 20_3 such that the resolution of each of the source images 20_1 to 20_3 becomes the target resolution determined by the target resolution determining unit 12. Each source image converted by each of the resolution converting units 14_1 to 14_3 is supplied to the image composition unit 15.

When receiving a supply of each source image converted by each of the resolution converting units 14_1 to 14_3, the image composition unit 15 synthesizes the converted source images such that the arrangement of each source image becomes the arrangement determined by the image arrangement determining unit 13. The image data synthesized by the image composition unit 15 is supplied to the display control units 16_1 and 16_2.

Each of the display control units 16_1 and 16_2 displays the image data supplied from the image composition unit 15 on each of the liquid crystal displays 10_1 and 10_2. In this case, each of the display control units 16_1 and 16_2 performs γ correction and color adjustment on each of the liquid crystal displays 10_1 and 10_2. Further, each of the display control units 16_1 and 16_2 performs local dimming control of adjusting the backlight luminance according to the images (the camera image 1, the camera image 2 and the map image) displayed on each of the liquid crystal displays 10_1 and 10_2.

Figure 3:
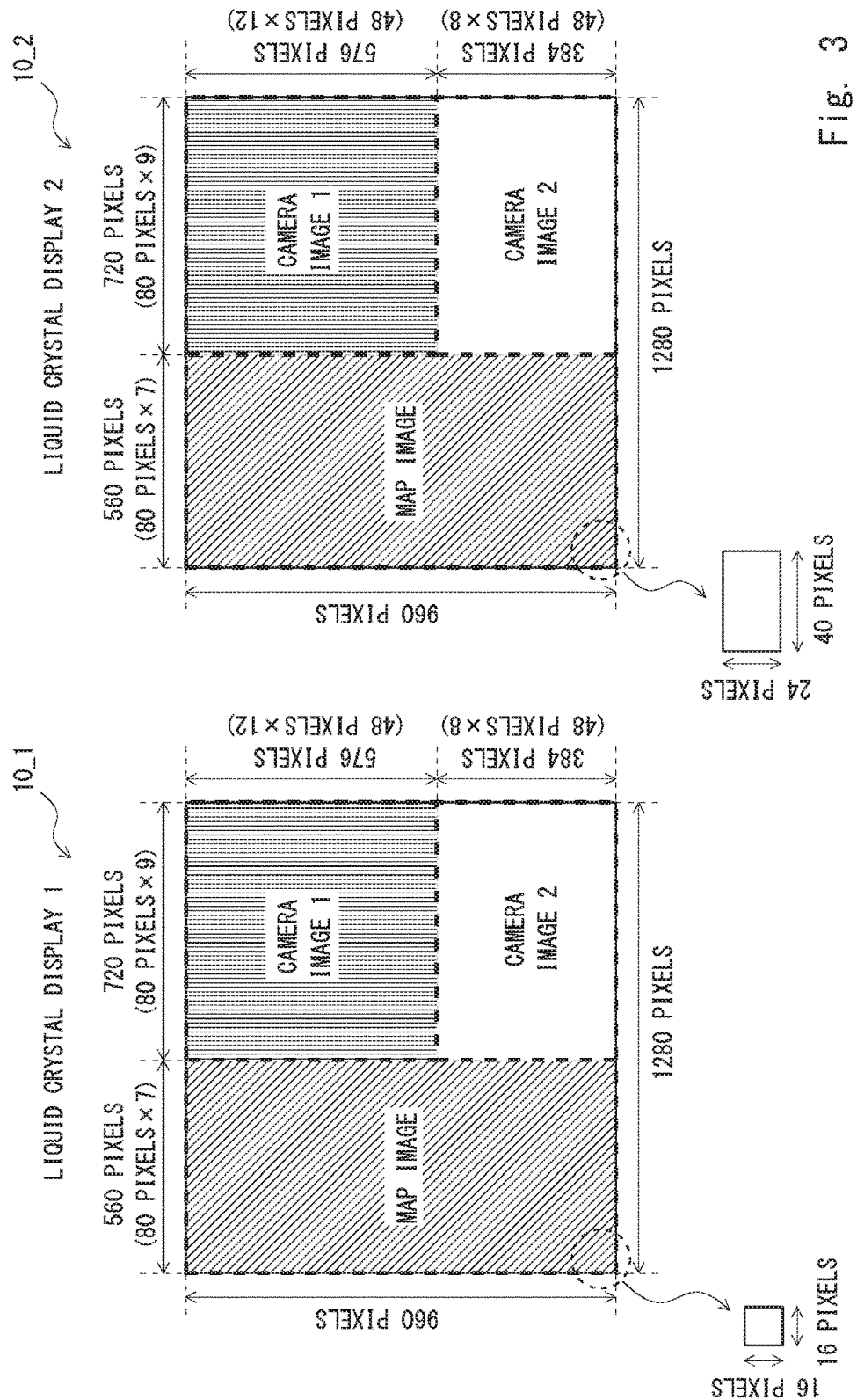
FIG. 3 is a view illustrating another example of a state where source images processed by using the image processing apparatus according to the first embodiment are displayed on the liquid crystal displays.

Next, a specific processing example of the image processing apparatus according to the present embodiment will be described with reference to FIG. 3. Each of the liquid crystal displays 10_1 and 10_2 illustrated in FIG. 3 is a display whose screen resolution in the horizontal direction is 1280 pix (pixel), and whose screen resolution in the vertical direction is 960 pix (pixel). Meanwhile, each of the liquid crystal displays 10_1 and 10_2 is a different model, and therefore the backlight control unit during local dimming control is different. More specifically, as illustrated in FIG. 3, the BL unit horizontal size of the liquid crystal display 10_1 is 16 pixels, and the BL unit vertical size is 16 pixels. Further, the liquid crystal display 10_2 has the BL unit horizontal size of 40 pixels, and the BL unit vertical size of 24 pixels.

When the three source images 20_1 to 20_3 (see FIG. 1) is displayed on the liquid crystal displays 10_1 and 10_2 illustrated in FIG. 3, the target resolution determining unit 12 determines the target resolution in the horizontal direction of each of the source images 20_1 to 20_3 such that the resolution in the horizontal direction of each of the three source images 20_1 to 20_3 becomes the common multiple of "16 pixels" which are the BL unit horizontal size of the liquid crystal display 10_1 and "40 pixels" which are the BL unit horizontal size of the liquid crystal display 10_2. In other words, the target resolution determining unit 12 determines the target resolution in the horizontal direction of each of the source images 20_1 to 20_3 such that the resolution becomes an integer multiple of "80 pixels" which are the least common multiple of "16 pixels" which are the BL unit horizontal size of the liquid crystal display 10_1 and "40 pixels" which are the BL unit horizontal size of the liquid crystal display 10_2.

Further, the target resolution determining unit 12 determines the target resolution in the vertical direction in each of the source images 20_1 to 20_3 such that the resolution in the vertical direction of each of the three source images 20_1 to 20_3 becomes the common multiple of "16 pixels" which are the BL unit vertical size of the liquid crystal display 10_1 and "24 pixels" which are the BL unit vertical size of the liquid crystal display 10_2. In other words, the target resolution determining unit 12 determines the target resolution in the vertical direction of each of the source images 20_1 to 20_3 such that the resolution becomes an integer multiple of "48 pixels" which are the least common multiple of "16 pixels" which are the BL unit vertical size of the liquid crystal display 10_1 and "24 pixels" which are the BL unit vertical size of the liquid crystal display 10_2.

In the example illustrated in FIG. 3, the target resolution determining unit 12 determines the target resolution such that the resolution in the horizontal direction of the source image 20_1 (camera image 1) is 720 pixels (80 pixels×9) and the resolution in the vertical direction is 576 pixels (48 pixels×12). Further, the target resolution determining unit 12 determines the target resolution such that the resolution in the horizontal direction of the source image 20_2 (camera image 2) is 720 pixels (80 pixels×9) and the resolution in the vertical direction is 576 pixels (48 pixels×8). Furthermore, the target resolution determining unit 12 determines the target resolution such that the resolution in the horizontal direction of the source image 20_3 (map image) is 560 pixels (80 pixels×7) and the resolution in the vertical direction is 960 pixels (48 pixels×20).

Still further, the image arrangement determining unit 13 determines the arrangement of each image such that the boundary in the horizontal direction of the source image after the resolution is converted is the integer multiple of the 80 pixels (least common multiple), and the boundary in the vertical direction is the integer multiple of the 48 pixels (least common multiple). More specifically, when the upper left position of each of the liquid crystal displays 10_1 and 10_2 is 0 pixel×0 pixel (horizontal direction×vertical direction), the image arrangement determining unit 13 arranges the source image 20_3 (map image) from an offset position of 0×0 pixel, arranges the source image 20_1 (camera image 1) from an offset position of 560×0 pixels, and arranges the source image 20_2 (camera image 2) from an offset position of 560×576 pixels. Consequently, the boundary in the horizontal direction between the source image 20_1 (camera image 1) and the source image 20_3 (map image) can be placed at a position of 560 pixels (80 pixels×7). Further, the boundary in the vertical direction between the source image 20_1 (camera image 1) and the source image 20_2 (camera image 2) can be placed at the position of 576 pixels (48 pixels×12).

This image processing can match the boundary of each of the source images 20_1 to 20_3 with the boundary of the backlight control unit during the local dimming control of the liquid crystal display 10_1 and the boundary of the backlight control unit during the local dimming control of the liquid crystal display 10_2.

As described with reference to the related art, the local dimming control divides a liquid crystal display into a plurality of areas, and controls a backlight per divided area. However, displaying the same source image on a plurality of liquid crystal displays causes the following problem.

That is, when the backlight control units during the local dimming control are different between a plurality of liquid crystal displays, and when the same source image is displayed on each liquid crystal display, the backlight cannot be appropriately controlled per area. Therefore, there is a problem that the local dimming control cannot be appropriately performed.

For example, there is a case where an in-vehicle liquid crystal display displays the same source image on a plurality of liquid crystal displays of a front seat and a rear seat. Further, when a liquid crystal display of a different model is used for these liquid crystal displays, there is a case where backlight control units during local dimming control are different between a plurality of liquid crystal displays. Therefore, when the same source image is displayed on each liquid crystal display, the backlight cannot be appropriately controlled per area. Therefore, there is a problem that the local dimming control cannot be appropriately performed. This problem will be more specifically described with reference to FIG. 12.

Figure 12:
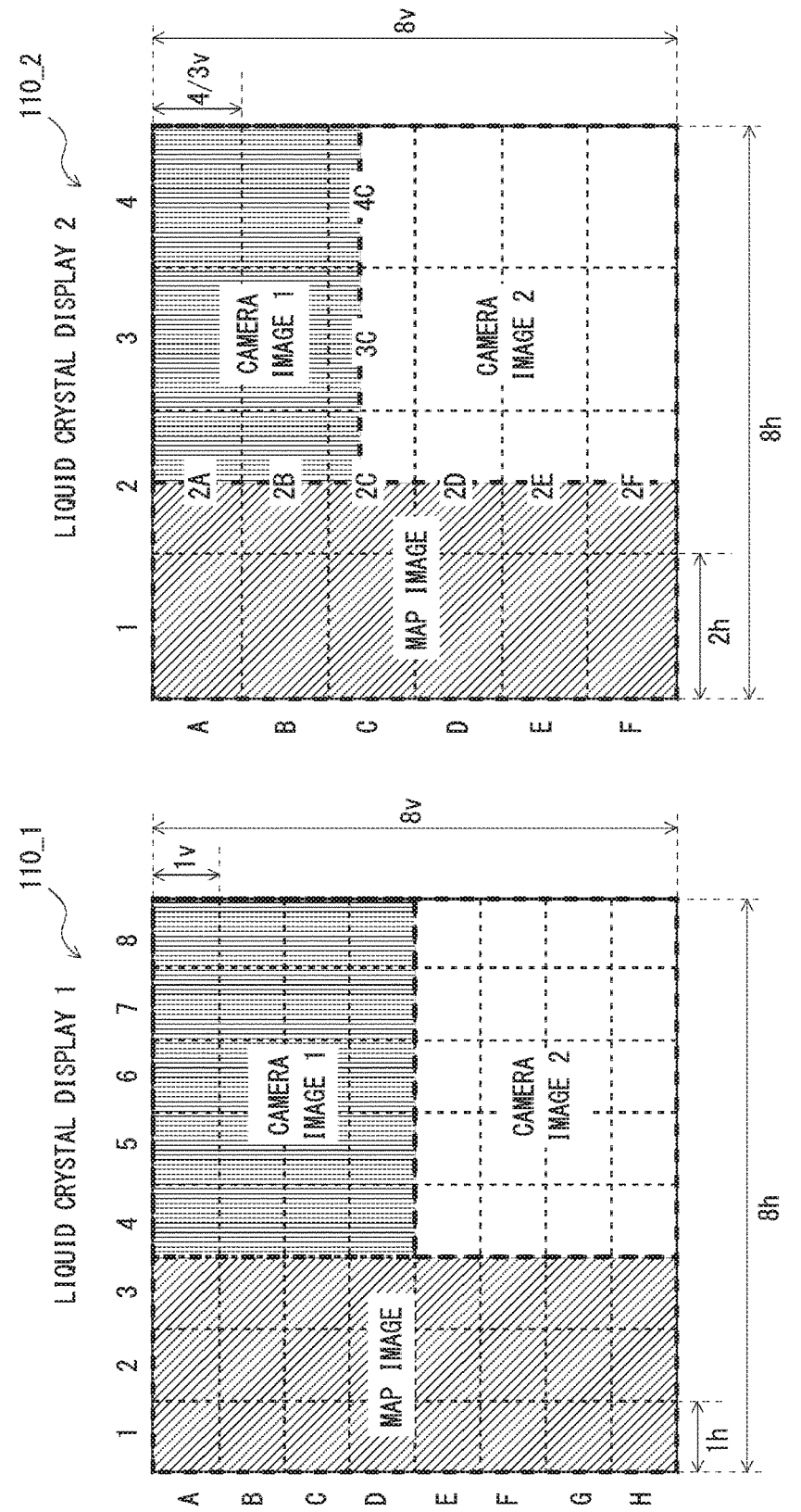
FIG. 12 is a view illustrating a state where source images are displayed on liquid crystal displays (a view for explaining a problem).

The liquid crystal displays 110_1 and 110_2 illustrated in FIG. 12 have screen resolutions equal to 8h×8v, and different backlight control units during local dimming control. That is, while the BL unit horizontal size of the liquid crystal display 110_1 is "1h" and the BL unit vertical size is "1v", the BL unit horizontal size of the liquid crystal display 110_2 is "2h" and the BL unit vertical size is "4/3v", and therefore the backlight control units during the local dimming control of the liquid crystal displays 110_1 and 110_2 are different.

When a plurality of source images are displayed on these liquid crystal displays 110_1 and 110_2, and when the boundary of each of a plurality of source images is adjusted to a BL unit horizontal size and a BL unit vertical size of the liquid crystal display 110_1, there is a case where the boundary of each of a plurality of source images does not match with the BL unit horizontal size and the BL unit vertical size of the liquid crystal display 110_2 in the liquid crystal display 110_2. Hence, in the liquid crystal display 110_2, there is a display section in which a plurality of source images exist in one BL control unit in a mixed manner. More specifically, in display sections 2A to 2F, 3C and 4C of the liquid crystal displays 110_2, a plurality of source images exist in a mixed manner.

In this regard, the backlight is controlled mainly based on a luminance distribution of each source image. However, each different source screen has different luminance distribution characteristics of each source image. For example, a map image, and a natural image inputted from a camera have different luminance distribution characteristics. Further, even in a case of camera images, for example, the camera image of a dark place and the camera image of a bright place have different luminance distribution characteristics.

In display sections (the display sections 2A to 2F, 3C and 4C of the liquid crystal display 110_2 in the example in FIG. 12) in which a plurality of source images of different luminance distribution characteristics exist in a mixed manner, the backlight cannot be appropriately controlled during the local dimming control. Therefore, power consumption of the liquid crystal display increases. Further, in these display sections, it is difficult to perform γ correction on images. Therefore, images deteriorate (a contrast lowers), and control of the liquid crystal displays becomes complicated.

By contrast with this, the image processing apparatus and the image processing method according to the present embodiment determine the target resolution in the horizontal direction of each of the source images 20_1 to 20_3 such that the resolution in the horizontal direction of each of a plurality of source images 20_1 to 20_3 becomes the common multiple of the BL unit horizontal size of the liquid crystal display 10_1 and the BL unit horizontal size of the liquid crystal display 10_2. By contrast with this, the image processing apparatus and the image processing method according to the present embodiment determine the target resolution in the vertical direction of each of the source images 20_1 to 20_3 such that the resolution in the vertical direction of each of a plurality of source images 20_1 to 20_3 becomes the common multiple of the BL unit vertical size of the liquid crystal display 10_1 and the BL unit vertical size of the liquid crystal display 10_2.

Hence, when a plurality of source images 20_1 to 20_3 are displayed on the liquid crystal displays 10_1 and 10_2 as illustrated in FIG. 2, it is possible to adjust the boundary of each of a plurality of source images to the BL unit horizontal size and the BL unit vertical size of each of the liquid crystal displays 10_1 and 10_2. In other words, it is possible to match the boundary of each of the source images 20_1 and 20_3 with the boundary of the backlight control unit during the local dimming control of the liquid crystal display 10_1 and the boundary of the backlight control unit during the local dimming control of the liquid crystal display 10_2.

Consequently, even when a plurality of source images 20_1 to 20_3 are displayed on the liquid crystal displays 10_1 and 10_2, each of the liquid crystal displays 10_1 and 10_2 can appropriately perform the local dimming control according to the backlight control unit.

Further, the image processing apparatus 1 illustrated in FIG. 1 receives an input of a plurality of source images 20_1 to 20_3, then performs the processing up to the processing of the image composition unit 15 by using common resources, and then performs backlight control and γ correction on each of the liquid crystal displays 10_1 and 10_2 by using the display control units 16_1 and 16_2 provided per liquid crystal display 10_1 and 10_2. Thus, it is possible to perform the processing up to the processing of the image composition unit 15 by using the common resources, so that it is possible to reduce a circuit scale of the image processing apparatus 1.

According to the above-described present embodiment, it is possible to provide the image processing apparatus and the image processing method which, when displaying the same source image on a plurality of liquid crystal displays, process source images so as to enable appropriate local dimming control.

In this regard, the present embodiment has described the configuration example where the image processing apparatus 1 controls the two liquid crystal displays 10_1 and 10_2. However, the number of liquid crystal displays controlled by the image processing apparatus 1 may be plural and is not limited in particular. When, for example, three liquid crystal displays are controlled, a resolution of each source image is determined such that a resolution in the horizontal direction of each source image becomes a common multiple of BL unit horizontal sizes of the three liquid crystal displays and a resolution in the vertical direction of each source image becomes a common multiple of BL unit vertical sizes of the three liquid crystal displays.

Second Embodiment

Figure 4:
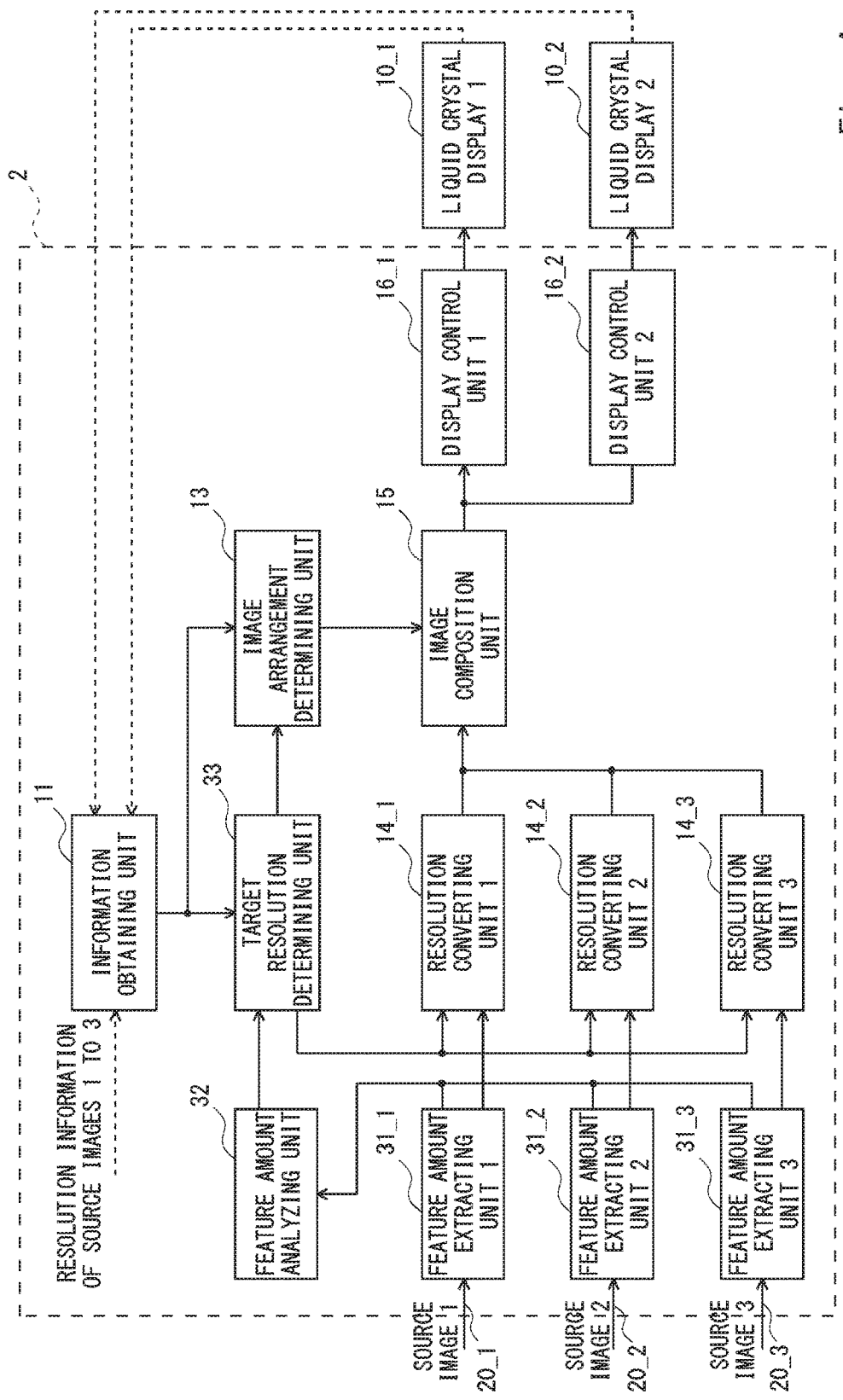
FIG. 4 is a block diagram illustrating an image processing apparatus according to a second embodiment.

Next, an image processing apparatus according to the second embodiment will be described. FIG. 4 is a block diagram illustrating the image processing apparatus according to the second embodiment. An image processing apparatus 2 according to the present embodiment differs from an image processing apparatus 1 (see FIG. 1) according to the first embodiment in including feature amount extracting units 31_1 to 31_3 and a feature amount analyzing unit 32. Components other than these components are the same as those in the image processing apparatus 1 described in the first embodiment, and therefore the same components will be assigned the same reference numerals and will not be described.

As illustrated in FIG. 4, the image processing apparatus 2 according to the present embodiment includes the feature amount extracting units 31_1 to 31_3 and the feature amount analyzing unit 32.

Each of the feature amount extracting units 31_1 to 31_3 extracts a feature amount of each of source images 20_1 to 20_3. The feature amount refers to, for example, luminance information of the source images 20_1 to 20_3. The feature amount extracted by each of the feature amount extracting units 31_1 to 31_3 is supplied to the feature amount analyzing unit 32.

The feature amount analyzing unit 32 analyzes the feature amount of each of the source images 20_1 to 20_3 supplied from each of the feature amount extracting units 31_1 to 31_3. More specifically, the feature amount analyzing unit 32 compares the feature amounts of the respective source images 20_1 to 20_3, and decides whether or not a difference between the feature amounts of the source images 20_1 to 20_3 is a predetermined threshold or more. For example, the feature amount analyzing unit 32 compares luminances of the respective source images 20_1 to 20_3, and decides whether or not a difference between the luminances of the source images 20_1 to 20_3 is a predetermined threshold or more. An analysis result of the feature amount analyzing unit 32 is supplied to the target resolution determining unit 33.

The target resolution determining unit 33 determines a target resolution of each of the source images 20_1 to 20_3 according to the analysis result of the feature amount analyzing unit 32. More specifically, when the difference between the feature amounts of the respective source images is the predetermined threshold or more, the target resolution determining unit 33 determines the target resolution of each of a plurality of source images 20_1 to 20_3. When, for example, the feature amount is the luminance, and when the difference between the luminances of the source images is the predetermined threshold or more, the target resolution determining unit 33 determines the target resolution of each of the source images 20_1 to 20_3.

In one example, the feature amount analyzing unit 32 compares an entire luminance average value of the source image 20_1, an entire luminance average value of the source image 20_2 and an entire luminance average value of the source image 20_3. Further, when a difference between these luminance average values is a predetermined threshold or more, the target resolution determining unit 33 determines the target resolution of each of the source images 20_1 to 20_3.

Figure 5:
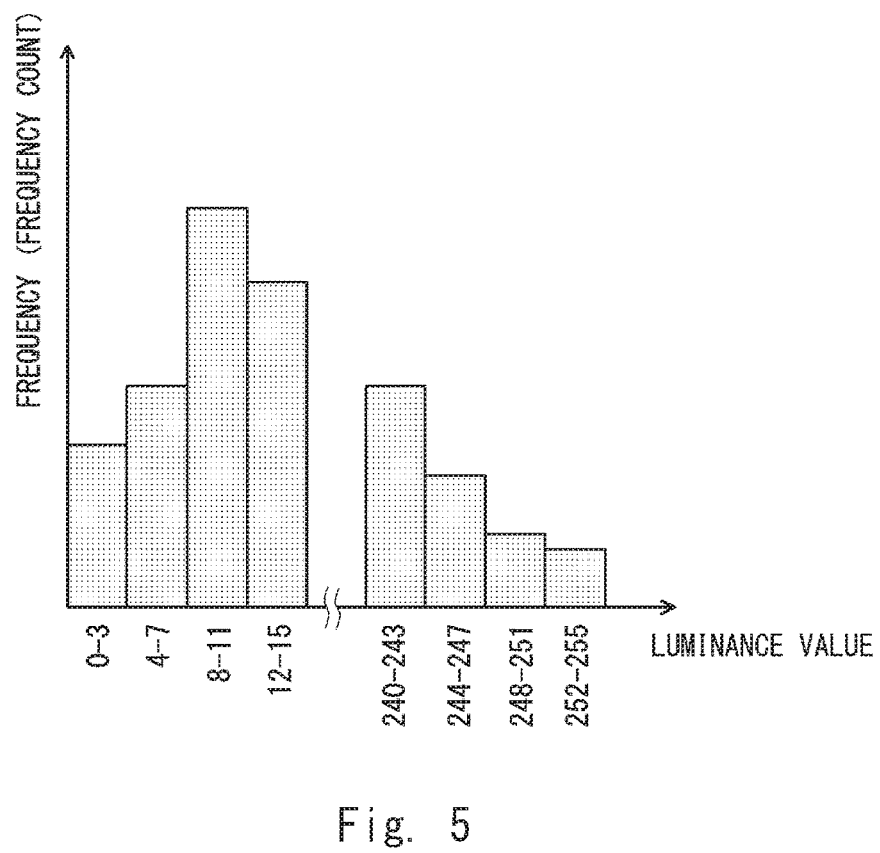
FIG. 5 is a graph illustrating an example of a histogram of luminance values of source images.

In another example, whether or not to determine the target resolution may be decided by using, for example, a histogram of luminance values of source images illustrated in FIG. 5. More specifically, when analyzing the feature amount of each of the source images 20_1 to 20_3 supplied from each of the feature amount extracting units 31_1 to 31_3, the feature amount analyzing unit 32 generates the histogram of the luminance values of the source images illustrated in FIG. 5 for each of the source images 20_1 to 20_3. According to the histogram of the luminance values illustrated in FIG. 5, luminance values of 0 to 255 are divided into 64 classes, and a frequency (frequency count) of a luminance value in each class is expressed by a graph.

The feature amount analyzing unit 32 compares the histograms of the luminance values of the respective source images 20_1 to 20_3. Further, when a difference between the frequencies (frequency counts) of the respective classes between the respective source images 20_1 to 20_3 is a predetermined threshold or more, the target resolution determining unit 33 determines the target resolution of each of the source images 20_1 to 20_3.

That is, when there is the difference between luminances of the respective source images 20_1 to 20_3, the difference between luminances at boundaries between the respective source images becomes great. In this case, as described in the first embodiment, the target resolution in a horizontal direction of each of the source images 20_1 to 20_3 is determined such that the resolution in the horizontal direction of each of a plurality of source images 20_1 to 20_3 becomes a common multiple of a BL unit horizontal size of the liquid crystal display 10_1 and a BL unit horizontal size of a liquid crystal display 10_2. Similarly, the target resolution in a vertical direction of each of the source images 20_1 to 20_3 is determined such that the resolution in the vertical direction of each of a plurality of source images 20_1 to 20_3 becomes a common multiple of a BL unit vertical size of the liquid crystal display 10_1 and a BL unit vertical size of the liquid crystal display 10_2.

By performing this processing, it is possible to match the boundary of each of the source images 20_1 to 20_3 with the boundary of a backlight control unit during local dimming control of the liquid crystal display 10_1, and a boundary of a backlight control unit during local dimming control of the liquid crystal display 10_2 (see FIG. 2).

Even when a plurality of source images 20_1 to 20_3 are displayed on the liquid crystal displays 10_1 and 10_2, it is possible to perform appropriate local dimming control on each of the liquid crystal displays 10_1 and 10_2 according to the backlight control units.

Meanwhile, when the difference between feature amounts (e.g., luminances) of the respective source images 20_1 to 20_3 is smaller than the predetermined threshold, the difference between the luminances at the boundaries between the respective source images 20_1 to 20_3 is small. In such a case, even when a plurality of source images exist in a mixed manner in the backlight control units (in an area) during local dimming control, there is hardly an influence such as image quality deterioration. Consequently, in such a case, the target resolution determining unit 33 can determine the resolution in the horizontal direction and the vertical direction of each of the source images 20_1 to 20_3 irrespectively of the BL unit horizontal size and the BL unit vertical size of each of the liquid crystal displays 10_1 and 10_2. Consequently, it is possible to flexibly determine the resolution of each of the source images 20_1 to 20_3.

In this regard, operations other than the above operation in the image processing apparatus 2 according to the present embodiment are the same as those described in the first embodiment, and therefore will not be described.

Third Embodiment

Figure 6:
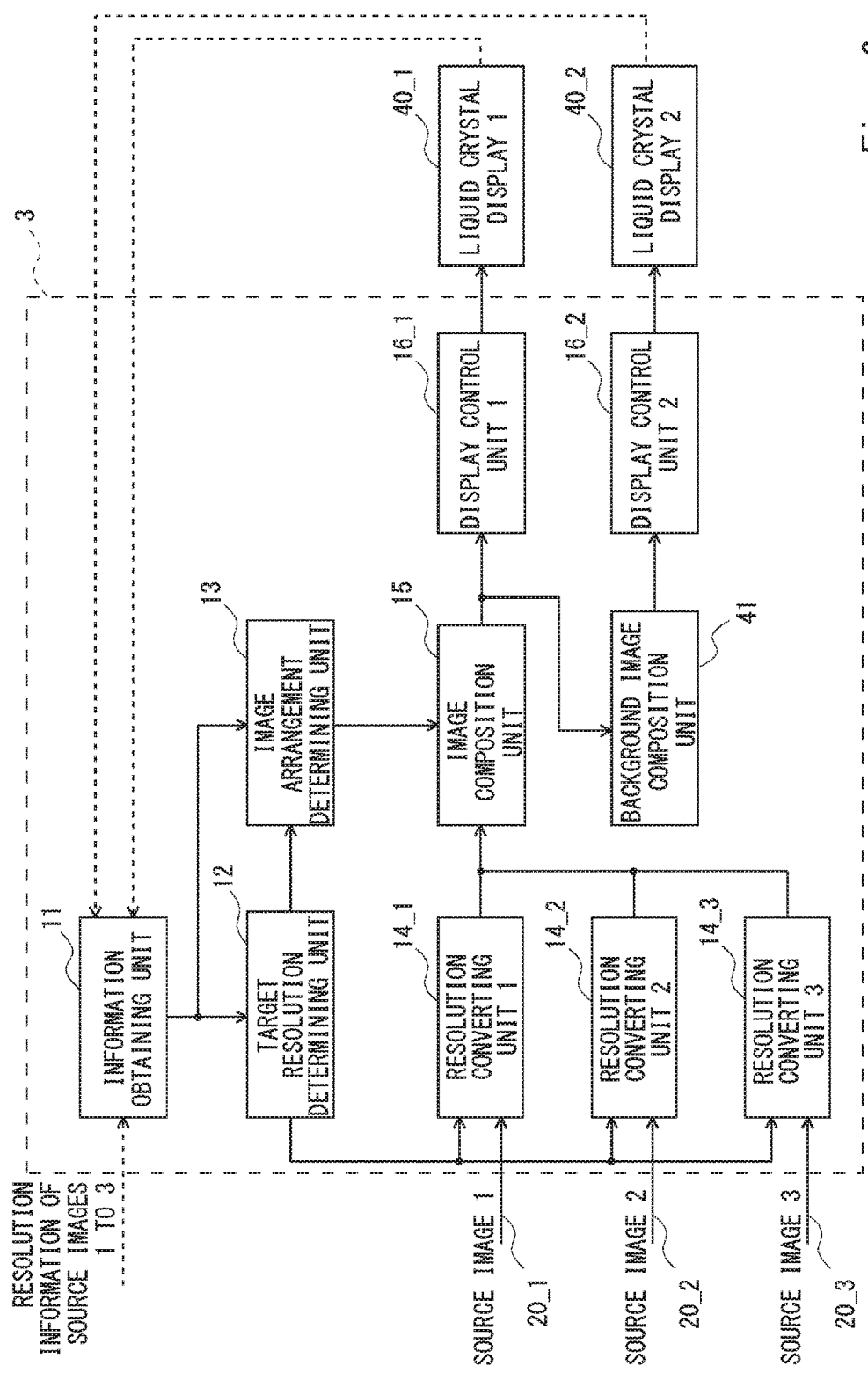
FIG. 6 is a block diagram illustrating an image processing apparatus according to a third embodiment.

Next, an image processing apparatus according to the third embodiment will be described. FIG. 6 is a block diagram illustrating the image processing apparatus according to the third embodiment. A case where an image processing apparatus 3 according to the present embodiment displays a plurality of source images 20_1 to 20_3 on a plurality of displays 40_1 to 40_2 of different screen resolutions will be described. In this regard, other components are the same as those in an image processing apparatus 1 described in the first embodiment, and therefore the same components will be assigned the same reference numerals and will not be described.

Figure 7:
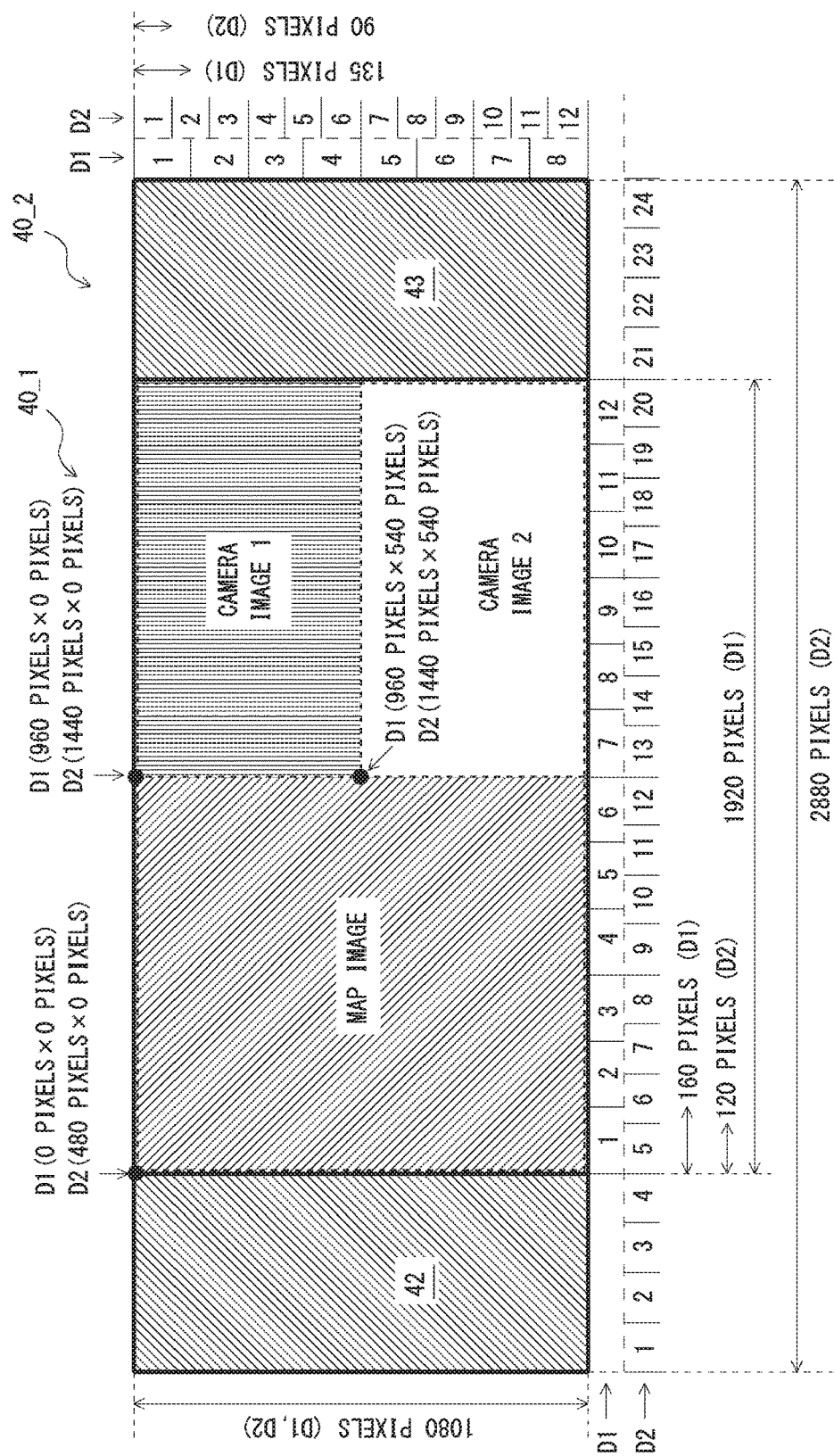
FIG. 7 is a view illustrating an example of a state where source images processed by using the image processing apparatus according to the third embodiment are displayed on liquid crystal displays.

As shown in FIG. 7, in the present embodiment, the screen resolutions of the liquid crystal displays 40_1 and 40_2 are different. In an example illustrated in FIG. 7, the screen resolution of the liquid crystal display 40_1 (D1) is 1920 pixels×1080 pixels (FHD), and the screen resolution of the liquid crystal display 40_2 (D2) is 2880 pixels×1080 pixels (1.5 FHD). Therefore, the liquid crystal display 40_1 has the smaller screen resolution than that of the liquid crystal display 40_2.

In the image processing apparatus 3 according to the present embodiment, a target resolution determining unit 12 determines a target resolution of each of the source images 20_1 to 20_3 such that a plurality of source images 20_1 to 20_3 fit in the liquid crystal display 40_1 of the smaller screen resolution.

More specifically describing with reference to FIG. 7, a BL unit horizontal size of the liquid crystal display 40_1 is 160 pixels, and a BL unit vertical size is 135 pixels. Further, the BL unit horizontal size of the liquid crystal display 40_2 is 120 pixels, and the BL unit vertical size is 90 pixels. Hence, the target resolution determining unit 12 determines a target resolution in a horizontal direction of each of the source images 20_1 to 20_3 such that a resolution in the horizontal direction of each of a plurality of source images 20_1 to 20_3 becomes a common multiple of "160 pixels" which are the BL unit horizontal size of the liquid crystal display 40_1 and "120 pixels" which are the BL unit horizontal size of the liquid crystal display 40_2 (in other words, an integer multiple of 480 pixels which are the least common multiple of the 160 pixels and the 120 pixels).

Further, the target resolution determining unit 12 determines a target resolution in a vertical direction of each of the source images 20_1 to 20_3 such that a resolution in the vertical direction of each of a plurality of source images 20_1 to 20_3 becomes a common multiple of "135 pixels"

which are the BL unit vertical size of the liquid crystal display 40_1 and "90 pixels" which are the BL unit vertical size of the liquid crystal display 40_2 (in other words, an integer multiple of 270 pixels which are the least common multiple of the 135 pixels and the 90 pixels).

Furthermore, the image arrangement determining unit 13 determines an arrangement of each of the source images 20_1 to 20_3 such that a boundary in the horizontal direction of each source image after the resolution is converted is at a position corresponding to the common multiple of "160 pixels" which are the BL unit horizontal size of the liquid crystal display 40_1 and "120 pixels" which are the BL unit horizontal size of the liquid crystal display 40_2. Still further, the image arrangement determining unit 13 determines the arrangement of each of the source images 20_1 to 20_3 such that a boundary in the vertical direction of each source image after the resolution is converted is at a position corresponding to the common multiple of "135 pixels" which are the BL unit vertical size of the liquid crystal display 40_1 and "90 pixels" which are the BL unit vertical size of the liquid crystal display 40_2.

In this case, the image arrangement determining unit 13 determines the arrangement of each of the source images 20_1 to 20_3 such that a plurality of source images 20_1 to 20_3 fit in the liquid crystal display 40_1 of the smaller screen resolution.

More specifically, in the example illustrated in FIG. 7, when an upper left position of each of the liquid crystal displays 40_1 and 40_2 is 0 pixel×0 pixel (horizontal direction×vertical direction), the image arrangement determining unit 13 arranges a map image (source image 20_3) at the position of 0 pixel and 0 pixel of the liquid crystal display 40_1, arranges a camera image 1 (source image 20_1) at a position of 960 pixels×0 pixel, and arranges a camera image 2 (source image 20_2) at a position of 960 pixels×540 pixels. Further, the image arrangement determining unit 13 arranges the map image (source image 20_3) at the position of 480 pixels×0 pixel of the liquid crystal display 40_2, arranges the camera image 1 (source image 20_1) at a position of 1440 pixels×0 pixel, and arranges the camera image 2 (source image 20_2) at a position of 1440 pixels×540 pixels.

By arranging each image, it is possible to match boundaries between the respective images (indicated by broken lines in FIG. 7) and a boundary between backlight control units of the liquid crystal displays 40_1 and 40_2. In this regard, the boundary between the backlight control units is the position corresponding to the common multiple of "160 pixels" which are the BL unit horizontal size of the liquid crystal display 40_1 and "120 pixels" which are the BL horizontal size of the liquid crystal display 40_2, and a position corresponding to a common multiple of "135 pixels" which are the BL unit vertical size of the liquid crystal display 40_1 and "90 pixels" which are the BL unit vertical size of the liquid crystal display 40_2.

In this case, an area in which the source image is not displayed is formed in the larger liquid crystal display 40_2. The image processing apparatus 3 according to the present embodiment synthesizes background images 42 and 43 in areas in which the source image of the liquid crystal display 40_2 is not displayed by using a background image composition unit 41.

That is, image data synthesized by an image composition unit 15 is adjusted to fit in the smaller liquid crystal display 40_1. Hence, when the image data synthesized by the image composition unit 15 is displayed as is in the liquid crystal display 40_2, the area in which the source image is not displayed is formed in the liquid crystal display 40_2.

Hence, the present embodiment includes the background image composition unit 41 which synthesizes the background images 42 and 43 on the image data outputted from the image composition unit 15. The image data synthesized with the background images 42 and 43 by the background image composition unit 41 is supplied to a display control unit 16_2. Further, the display control unit 16_2 displays the image data synthesized with the background images 42 and 43 on the liquid crystal display 40_2.

By using the above-described image processing apparatus 3 according to the present embodiment, it is possible to display a plurality of source images on a plurality of liquid crystal displays of different screen resolutions. In this regard, the screen resolutions of the liquid crystal displays 40_1 and 40_2 illustrated in FIG. 7 are exemplary resolutions, and liquid crystal displays having other screen resolutions may be used in the present embodiment.

Fourth Embodiment

Next, an image processing apparatus according to the fourth embodiment will be described. An image processing apparatus 3 described in the third embodiment synthesizes background images 42 and 43 in areas in which a source image of a liquid crystal display 40_2 is not displayed (see FIG. 7). By contrast with this, an image processing apparatus 4 according to the fourth embodiment converts a resolution such that image data synthesized by an image composition unit 15 has a resolution matching a screen resolution of the liquid crystal display 40_2 (see FIG. 9). In this regard, components other than these components are the same as those in the image processing apparatus 3, and therefore the same components will be assigned the same reference numerals and will not be described.

As illustrated in FIG. 7, in the present embodiment, too, screen resolutions of liquid crystal displays 40_1 and 40_2 are different. In the example illustrated in FIG. 7, the screen resolution of the liquid crystal display 40_1 is 1920×1080 pixels, and the screen resolution of the liquid crystal display 40_2 is 2880 pixels×1080 pixels. Therefore, the liquid crystal display 40_1 has the smaller screen resolution than that of the liquid crystal display 40_2.

Similar to the third embodiment, a target resolution determining unit 12 determines a target resolution of each of source images 20_1 to 20_3 such that a plurality of source images 20_1 to 20_3 fit in the liquid crystal display 40_1 of the smaller screen resolution.

That is, as illustrated in FIG. 7, the target resolution determining unit 12 determines a target resolution in a horizontal direction of each of the source images 20_1 to 20_3 such that a resolution in the horizontal direction of each of a plurality of source images 20_1 to 20_3 becomes a common multiple of "160 pixels" which are the BL unit horizontal size of the liquid crystal display 40_1 and "120 pixels" which are the BL unit horizontal size of the liquid crystal display 40_2 (in other words, an integer multiple of 480 pixels which are the least common multiple of the 160 pixels and the 120 pixels).

Further, the target resolution determining unit 12 determines a target resolution in a vertical direction of each of the source images 20_1 to 20_3 such that a resolution in the vertical direction of each of a plurality of source images 20_1 to 20_3 becomes a common multiple of "135 pixels" which are the BL unit vertical size of the liquid crystal display 40_1 and "90 pixels" which are the BL unit vertical size of the liquid crystal display 40_2 (in other words, an integer multiple of 270 pixels which are the least common multiple of the 135 pixels and the 90 pixels).

Furthermore, the image arrangement determining unit 13 determines an arrangement of each of the source images 20_1 to 20_3 such that a boundary in the horizontal direction of each source image after the resolution is converted is at a position corresponding to the common multiple of "160 pixels" which are the BL unit horizontal size of the liquid crystal display 10_1 and "120 pixels" which are the BL unit horizontal size of the liquid crystal display 10_2. Still further, the image arrangement determining unit 13 determines the arrangement of each of the source images 20_1 to 20_3 such that a boundary in the vertical direction of each source image after the resolution is converted is at a position corresponding to the common multiple of "135 pixels" which are the BL unit vertical size of the liquid crystal display 40_1 and "90 pixels" which are the BL unit vertical size of the liquid crystal display 40_2.

In this case, the image arrangement determining unit 13 determines the arrangement of each of the source images 20_1 to 20_3 such that a plurality of source images 20_1 to 20_3 fit in the liquid crystal display 40_1 of the smaller screen resolution as illustrated in FIG. 7.

Figure 8:
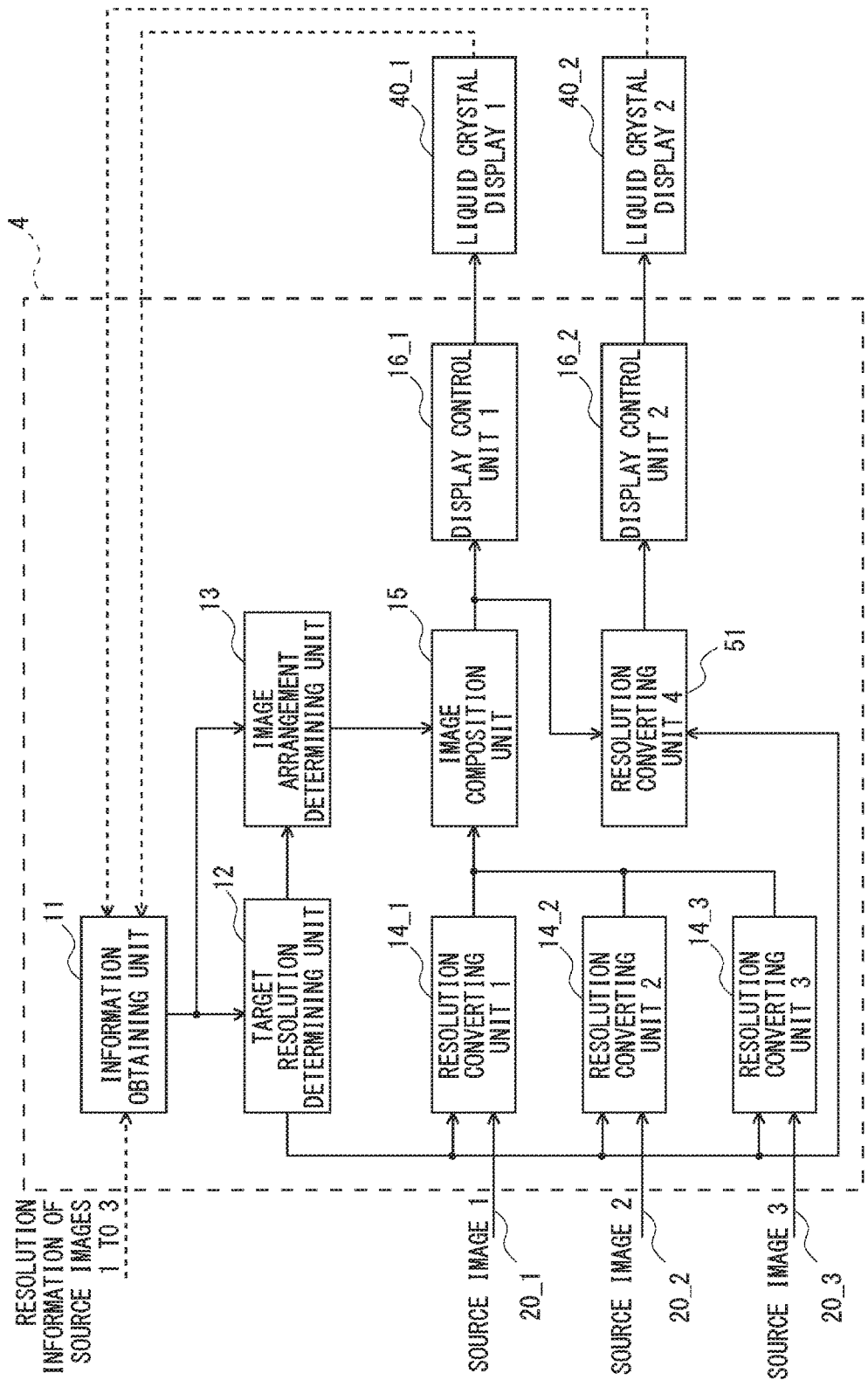
FIG. 8 is a block diagram illustrating an image processing apparatus according to a fourth embodiment.
Figure 9:
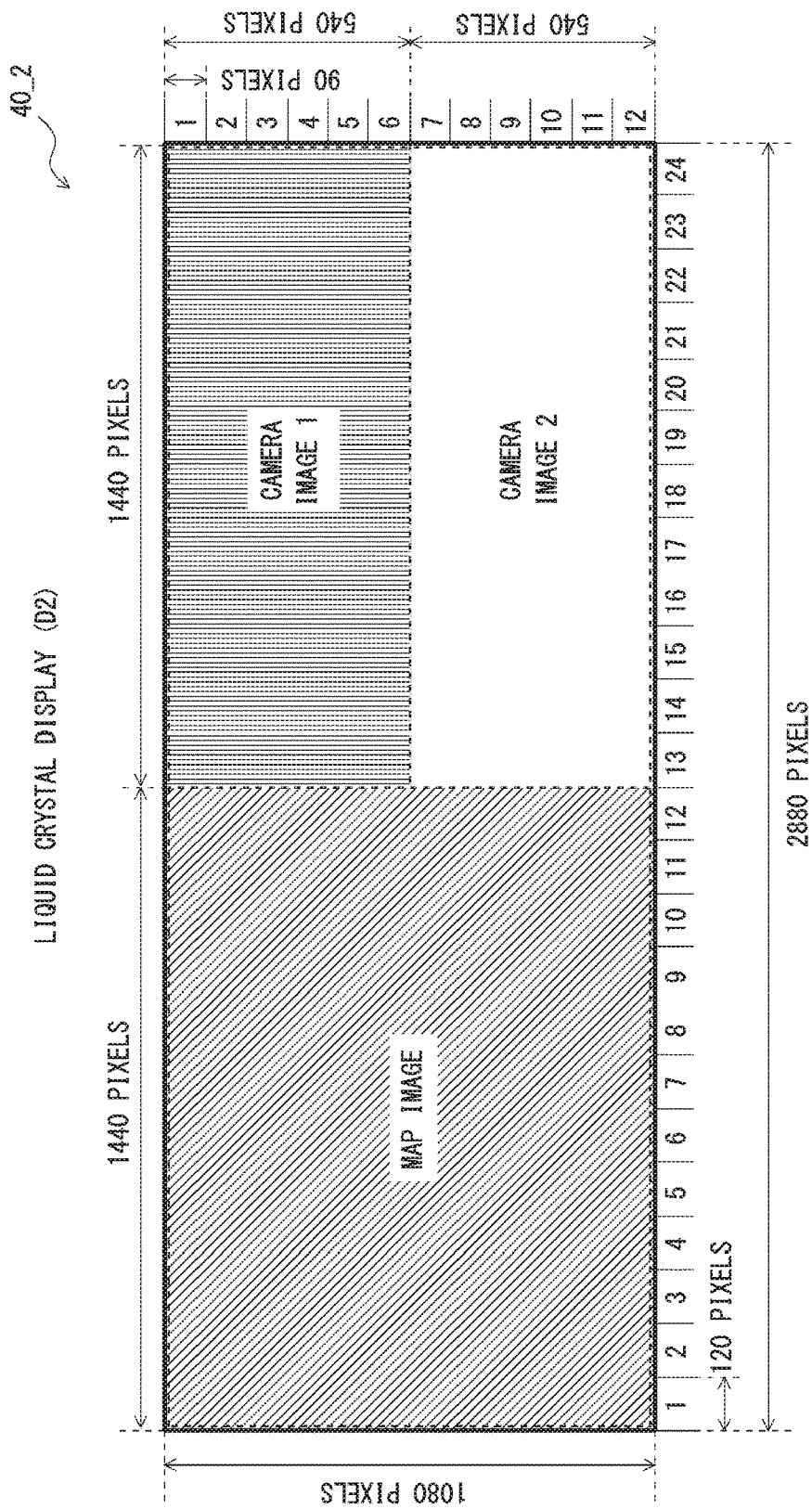
FIG. 9 is a view illustrating an example of a state where source images processed by using the image processing apparatus according to the fourth embodiment are displayed on liquid crystal displays.

Further, as illustrated in FIG. 9, in the present embodiment, a resolution is converted such that an image displayed on the liquid crystal display 40_2 has a resolution corresponding to the screen resolution of the liquid crystal display 40_2. That is, the image processing apparatus 4 illustrated in FIG. 8 includes a resolution converting unit 51 which converts the resolution of image data outputted from the image composition unit 15. Further, the resolution converting unit 51 converts the resolution such that the image data synthesized by the image composition unit 15 has a resolution corresponding to the screen resolution of the liquid crystal display 40_2.

More specifically, the resolution converting unit 51 converts the resolution of the image data (a size matching the liquid crystal display 40_1: 1920 pixels×1080 pixels) outputted from the composition unit 15 into 2880 pixels×1080 pixels which is a size matching the liquid crystal display 40_2. As a result, as illustrated in FIG. 9, the resolution of a map image (source image 20_3) displayed on the liquid crystal display 40_2 is converted from 960 pixels×1080 pixels into 1440 pixels×1080 pixels. Further, the resolution of a camera image 1 (source image 20_1) displayed on the liquid crystal display 40_2 is converted from 960 pixels×540 pixels into 1440 pixels×540 pixels. Furthermore, a resolution of a camera image 2 (source image 20_2) displayed on the liquid crystal display 40_2 is converted from 960 pixels×540 pixels into 1440 pixels×540 pixels.

In addition, a target resolution of the resolution converting unit 51 is determined by the target resolution determining unit 12. That is, the target resolution determining unit 12 determines the target resolution of the resolution converting unit 51 based on the screen resolution of each of the liquid crystal displays 40_1 and 40_2 supplied from an information obtaining unit 11. More specifically, the target resolution determining unit 12 determines the target resolution such that the screen resolution of the smaller liquid crystal display 40_1 becomes the screen resolution of the larger liquid crystal display 40_2.

In this regard, the target resolution of the resolution converting unit 51 needs to be determined such that the resolution in the horizontal direction of each of a plurality of source images 20_1 to 20_3 becomes the common multiple of the BL unit horizontal size of the liquid crystal display 40_1 and the BL unit horizontal size of the liquid crystal display 40_2, and the resolution in the vertical direction of each of a plurality of source images 20_1 to 20_3 becomes the common multiple of the BL unit vertical size of the liquid crystal display 40_1 and the BL unit vertical size of the liquid crystal display 40_2. In other words, it is necessary to match a boundary of each image (indicated by broken lines in FIG. 9) and a boundary of the backlight control unit of the liquid crystal display 40_2. Hence, following conditions need to be satisfied.

Parameters are defined as follows. In this regard, the following "size" corresponds to "pixels".

Horizontal size of source image 20_1=h_src1 (corresponding to a horizontal size of the source image 20_1 processed by a resolution converting unit 14_1. In the example illustrated in FIG. 7, h_src1=960 pixels).

Vertical size of source image 20_1=v_src1 (corresponding to a vertical size of the source image 20_1 processed by a resolution converting unit 14_1. In the example illustrated in FIG. 7, v_src1=1080 pixels).

Horizontal size of source image 20_2=h_src2 (corresponding to a horizontal size of the source image 20_2 processed by a resolution converting unit 14_2. In the example illustrated in FIG. 7, h_src2=960 pixels).

Vertical size of source image 20_2=v_src2 (corresponding to a vertical size of the source image 20_2 processed by the resolution converting unit 14_2. In the example illustrated in FIG. 7, v_src2=540 pixels).

Horizontal size of source image 20_3=h_src3 (corresponding to a horizontal size of the source image 20_3 processed by a resolution converting unit 14_3. In the example illustrated in FIG. 7, h_src3=960 pixels).

Vertical size of source image 20_3=v_src3 (corresponding to a vertical size of the source image 20_3 processed by the resolution converting unit 14_3. In the example illustrated in FIG. 7, v_src3=540 pixels).

Resolution conversion horizontal scale factor for liquid crystal display 40_2=h_scale (which is a horizontal scale factor of the resolution converting unit 51 and is h_scale=2880/1920=1.5 in the examples in FIGS. 7 and 9).

Resolution conversion vertical scale factor for liquid crystal display 40_2=v_scale (which is a vertical scale factor of the resolution converting unit 51 and is v_scale=1080/1080=1 in the examples in FIGS. 7 and 9).

Least common multiple of horizontal sizes of liquid crystal display 40_1 and liquid crystal display 40_2=min_h (min_h=480 pixels in cases of FIGS. 7 and 9).

Least common multiple of vertical sizes of liquid crystal display 40_1 and liquid crystal display 40_2=min_v (min_v=270 pixels in cases of FIGS. 7 and 9).

When the parameters are defined as described above, all of following conditions (1) to (4) need to be satisfied such that the resolution in the horizontal direction of each of a plurality of source images 20_1 to 20_3 becomes the common multiple of the BL unit horizontal size of the liquid crystal display 40_1 and the BL unit horizontal size of the liquid crystal display 40_2, and the resolution in the vertical direction of each of a plurality of source images 20_1 to 20_3 becomes the common multiple of the BL unit vertical size of the liquid crystal display 40_1 and the BL unit vertical size of the liquid crystal display 40_2.

$$h\_src1, h\_src2 \text{ and } h\_src3 \text{ are integer multiples of } min\_h. \qquad (1)$$

$$v\_src1, v\_src2 \text{ and } v\_src3 \text{ are integer multiples of } min\_v. \qquad (2)$$

$$h\_src1 \times h\_scale, h\_src2 \times h\_scale \text{ and } h\_src3 \times h\_scale$$
$$\text{are integer multiples of } min\_h. \quad (3)$$

$$v\_src1 \times v\_scale, v\_src2 \times v\_scale \text{ and } v\_src3 \times v\_scale$$
$$\text{are integer multiples of } min\_v. \quad (4)$$

When the above conditions are satisfied, it is possible to match the boundary of each source image of the liquid crystal display 40_1 in FIG. 7 with the boundary of a BL adjustment unit of the liquid crystal display 40_1 (see broken lines in FIG. 7), and match the boundary of each source image converted by the resolution converting unit 51 with the boundary of a BL adjustment unit of the liquid crystal display 40_2 (see broken lines in FIG. 9).

By using the above-described image processing apparatus 4 according to the present embodiment, it is possible to display a plurality of source images matching the screen resolution of each liquid crystal display when a plurality of source images are displayed on a plurality of liquid crystal displays of the different screen resolutions. In this regard, the screen resolutions of the liquid crystal displays 40_1 and 40_2 illustrated in FIG. 9 are exemplary resolutions, and liquid crystal displays having screen resolutions other than the screen resolutions may be used in the present embodiment.

Other Embodiment

Next, other embodiments will be described.

A case where image processing apparatuses 1 to 4 described in the first to fourth embodiments are applied to an in-vehicle image processing system will be described in the present embodiment. In this regard, a case where the image processing apparatus 1 according to the first embodiment is applied to the in-vehicle image processing system will be described below. The same applies to the cases where the image processing apparatuses 2 to 4 according to the second to fourth embodiments are applied to the in-vehicle image processing systems, too.

Figure 10:
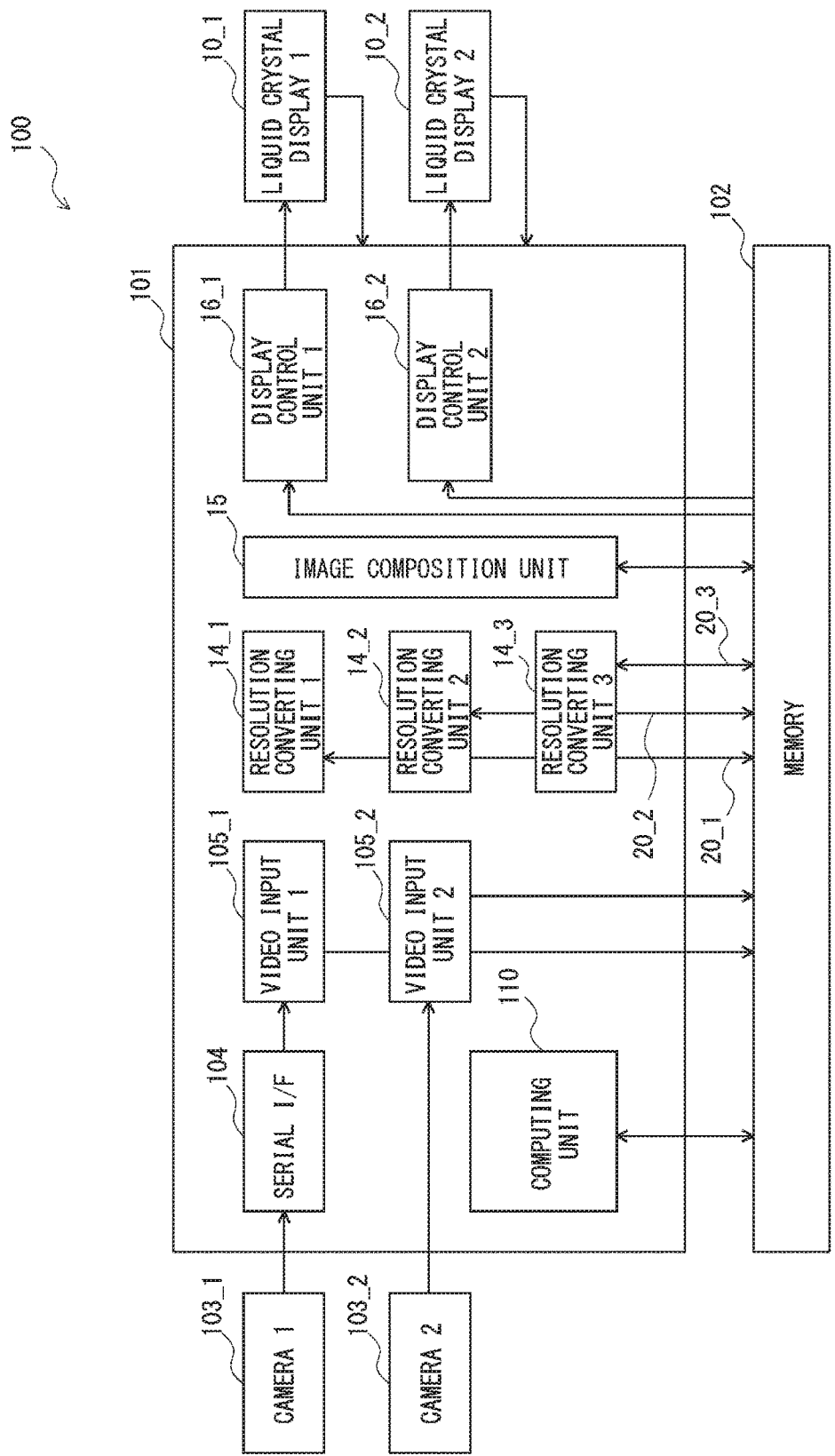
FIG. 10 is a block diagram illustrating a configuration example where the image processing apparatus according to the embodiment is applied to an in-vehicle image processing system.

FIG. 10 is a block diagram illustrating a configuration example where the image processing apparatus according to the first embodiment is applied to the in-vehicle image processing system. As illustrated in FIG. 10, the image processing system 100 includes a processor 101 and a memory 102. The processor 101 includes a serial I/F 104, video input units 105_1 and 105_2, resolution converting units 14_1 to 14_3, an image composition unit 15, display control units 16_1 and 16_2 and a computing unit 110. In this regard, in the image processing system 100 illustrated in FIG. 10, the same components as those in the image processing apparatus 1 illustrated in FIG. 1 will be assigned the same reference numerals. Further, processing of an information obtaining unit 11, a target resolution determining unit 12 and an image arrangement determining unit 13 of the image processing apparatus 1 illustrated in FIG. 1 is performed by the computing unit 110 of the processor 101 illustrated in FIG. 10.

The processor 101 receives a supply of source images from cameras 103_1 and 103_2. The source image supplied from the camera 103_1 is temporarily stored in the memory 102 via the serial I/F 104 and the video input unit 105_1. The source image supplied from the camera 103_2 is temporarily stored in the memory 102 via the video input unit 105_2. Further, a source image corresponding to a map image is generated by the computing unit 110. The source image generated by the computing unit 110 is temporarily stored in the memory 102.

Furthermore, the processor 101 is connected with liquid crystal displays 10_1 and 10_2 via external terminals, and obtains a screen resolution, a BL unit horizontal size and a BL unit vertical size of each of the liquid crystal displays 10_1 and 10_2 from the liquid crystal displays 10_1 and 10_2. In this regard, when the screen resolution, the BL unit horizontal size and the BL unit vertical size are stored as setting information in advance in the memory 102, the processor 101 can obtain the screen resolution, the BL unit horizontal size and the BL unit vertical size from the memory 102.

Next, image processing of the image processing system 100 illustrated in FIG. 10 will be described.

The computing unit 110 obtains information related to the screen resolution, the BL unit horizontal size and the BL unit vertical size of each of the liquid crystal displays 10_1 and 10_2 in advance. The computing unit 110 can directly obtain the information related to the screen resolution, the BL unit horizontal size and the BL unit vertical size from each of the liquid crystal displays 10_1 and 10_2. Further, when, for example, the screen resolution, the BL unit horizontal size and the BL unit vertical size are stored as the configuration information in the memory 102 in advance, the computing unit 110 can obtain the screen resolution, the BL unit horizontal size and the BL unit vertical size from the memory 102 in advance.

Furthermore, the computing unit 110 obtains information related to a resolution of each of a plurality of source images 20_1 to 20_3 stored in the memory.

Subsequently, the computing unit 110 determines a target resolution of each of the source images 20_1 to 20_3 based on the BL unit horizontal size and the BL unit vertical size of each of the liquid crystal displays 10_1 and 10_2, and the information related to the resolution of each of the source images 20_1 to 20_3.

In this case, the computing unit 110 determines the target resolution in a horizontal direction of each of the source images 20_1 to 20_3 such that the resolution in the horizontal direction of each of a plurality of source images 20_1 to 20_3 becomes a common multiple of the BL unit horizontal size of the liquid crystal display 10_1 and the BL unit horizontal size of the liquid crystal display 10_2. Similarly, the computing unit 110 determines the target resolution in a vertical direction of each of the source images 20_1 to 20_3 such that the resolution in the vertical direction of each of a plurality of source images 20_1 to 20_3 becomes a common multiple of the BL unit vertical size of the liquid crystal display 10_1 and the BL unit vertical size of the liquid crystal display 10_2.

The target resolution of each of the source images 20_1 to 20_3 determined by the computing unit 110 is supplied to resolution converting units 14_1 to 14_3.

Further, the computing unit 110 determines an arrangement of each of the source images 20_1 to 20_3 displayed on the liquid crystal displays 10_1 and 10_2, based on the information related to the screen resolution, the BL unit horizontal size and the BL unit vertical size of each of the liquid crystal displays 10_1 and 10_2, and the target resolution of each of the source images 20_1 to 20_3, and outputs information related to the determined arrangement of each of the source images 20_1 to 20_3 to the image composition unit 15.

In this case, the computing unit 110 determines the arrangement of each source image such that a boundary in the horizontal direction of each source image after the resolution is converted is at a position corresponding to the common multiple of the BL unit horizontal size of the liquid crystal display 10_1 and the BL unit horizontal size of the liquid crystal display 10_2. Further, the computing unit 110 determines an arrangement of each source image such that a boundary in the vertical direction of each source image after the resolution is converted is at a position corresponding to the common multiple of the BL unit vertical size of the liquid crystal display 10_1 and the BL unit vertical size of the liquid crystal display 10_2.

Subsequently, when the source images 20_1 to 20_3 are supplied to each of the resolution converting units 14_1 to 14_3, each of the resolution converting units 14_1 to 14_3 converts the resolution of each of the source images 20_1 to 20_3 such that the resolution of each of the source images 20_1 to 20_3 becomes the target resolution determined by the computing unit 110. The source image converted by each of the resolution converting units 14_1 to 14_3 is temporarily stored in the memory 102, and then is supplied to the image composition unit 15.

When receiving a supply of the converted source images, the image composition unit 15 synthesizes the converted source images such that the arrangement of each source image becomes the arrangement determined by the computing unit 110. The image data synthesized by the image composition unit 15 is temporarily stored in the memory 102 and then is supplied to the display control units 16_1 and 16_2.

Each of the display control units 16_1 and 16_2 displays the image data synthesized by the image composition unit 15 on each of the liquid crystal displays 10_1 and 10_2. In this case, each of the display control units 16_1 and 16_2 performs γ correction and color adjustment on each of the liquid crystal displays 10_1 and 10_2. Further, each of the display control units 16_1 and 16_2 performs local dimming control of adjusting a backlight luminance according to images (the camera image 1, the camera image 2 and the map image) displayed on each of the liquid crystal displays 10_1 and 10_2.

In addition, a case where the source images supplied from the cameras 103_1 and 103_2 are temporarily stored in the memory 102 and then are supplied to the resolution converting units 14_1 to 14_3 has been described with reference to FIG. 10. However, the present embodiment employs a configuration where the source images supplied from the cameras 103_1 and 103_2 are directly supplied to the resolution converting units 14_1 to 14_3.

Figure 11:
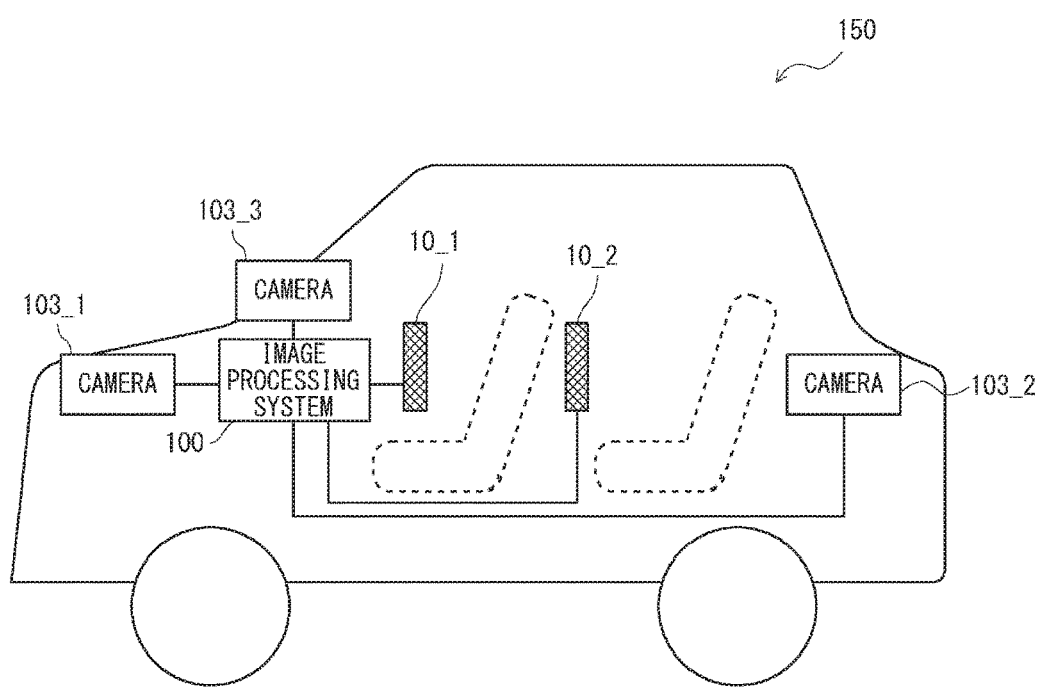
FIG. 11 is a view illustrating a configuration example where an image is displayed on an in-vehicle display by using the image processing apparatus according to the embodiment.

FIG. 11 is a view illustrating a configuration example where an image is displayed on the in-vehicle display by using the image processing apparatus according to the embodiment. As illustrated in FIG. 11, the liquid crystal displays 10_1 and 10_2, the image processing system 100 and the cameras 103_1 to 103_3 are mounted on a vehicle 150. The liquid crystal display 10_1 is a liquid crystal display for a front seat, and the liquid crystal display 10_2 is a liquid crystal display for a rear seat. The camera 103_1 obtains video images of a front of the vehicle 150. The camera 103_2 obtains video images of aback of the vehicle 150. The camera 103_3 obtains video images of sides (typically left and right sides) of the vehicle 150. The image processing system 100 corresponds to the image processing system 100 illustrated in FIG. 10.

In the vehicle 150 illustrated in FIG. 11, too, source images are supplied from the cameras 103_1 to 103_3 to the image processing system 100. Further, by executing the above-described processing, the image processing system 100 can display each source image on each of the liquid crystal display 10_1 for the front seat and the liquid crystal display 10_2 for the rear seat. In this regard, the image processing of the image processing system 100 is the same as the above-described processing, and therefore will not be described.

Each of the above-described embodiments may be optionally combined. For example, feature amount extracting units 31_1 to 31_3 and a feature amount analyzing unit 32 of the image processing apparatus 2 described in the second embodiment may be provided in the image processing apparatuses 3 and 4 described in the third and fourth embodiments.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. An image processing apparatus configured to perform image processing of displaying an image obtained by synthesizing a plurality of source images on first and second displays of different control units of backlights during local dimming control, the image processing apparatus comprising:

an information obtaining unit configured to obtain a first horizontal direction size and a first vertical direction size that are a horizontal direction size and a vertical direction size of the control unit of the backlight of the first display, obtain a second horizontal direction size and a second vertical direction size that are a horizontal direction size and a vertical direction size of the control unit of the backlight of the second display, and obtain a resolution of each of the plurality of source images;

a target resolution determining unit configured to determine a target resolution of the plurality of source images based on the first horizontal direction size, the first vertical direction size, the second horizontal direction size and the second vertical direction size;

a first resolution converting unit configured to convert a resolution of each of the plurality of source images such that the resolution of each of the plurality of source images becomes the target resolution; and an image composition unit configured to synthesize each of the plurality of source images converted by the first resolution converting unit.

2. The image processing apparatus according to claim 1, wherein the target resolution determining unit is configured to determine a target resolution in a horizontal direction of the plurality of source images such that a resolution in the horizontal direction of each of the plurality of source images becomes a common multiple of the first horizontal direction size and the second horizontal direction size, and determine a target resolution in a vertical direction of the plurality of source images such that a resolution in the vertical direction of each of the plurality of source images becomes a common multiple of the first vertical direction size and the second vertical direction size.

3. The image processing apparatus according to claim 2, further comprising an image arrangement determining unit configured to determine an arrangement of the plurality of source images such that a boundary in the horizontal direction between the plurality of source images is at a position corresponding to the common multiple of the first horizontal direction size and the second horizontal direction size, and a boundary in the vertical direction between the plurality of source images is at a position corresponding to the common multiple of the first vertical direction size and the second vertical direction size.

4. The image processing apparatus according to claim 3, further comprising first and second display control units configured to control the first and second displays, respectively,
- wherein the first and second display control units are configured to, when displaying the source images synthesized by the image composition unit on the first and second displays, control local dimming of the backlights of the first and second displays.

5. The image processing apparatus according to claim 1, wherein the information obtaining unit is configured to obtain the first horizontal direction size and the first vertical direction size from the first display, and obtain the second horizontal direction size and the second vertical direction size from the second display.

6. The image processing apparatus according to claim 1, further comprising a register configured to store the first horizontal direction size, the first vertical direction size, the second horizontal direction size and the second vertical direction size in advance,
- wherein the information obtaining unit is configured to obtain the first horizontal direction size, the first vertical direction size, the second horizontal direction size and the second vertical direction size from the register.

7. The image processing apparatus according to claim 1, further comprising:
- a feature amount extracting unit configured to extract a feature amount of each of the plurality of source images; and
- a feature amount analyzing unit configured to analyze the feature amount extracted by the feature amount extracting unit,
- wherein the target resolution determining unit is configured to determine the target resolution of each of the source images according to an analysis result of the feature amount analyzing unit.

8. The image processing apparatus according to claim 7, wherein
- the feature amount extracting unit is configured to extract a luminance of each of the source images as the feature amount,
- the feature amount analyzing unit is configured to analyze whether or not a difference between the luminances of the respective source images is a predetermined threshold or more, and
- the target resolution determining unit is configured to, when the difference between the luminances of the respective source images is the predetermined threshold or more, determine the target resolution of each of the plurality of source images.

9. The image processing apparatus according to claim 1, wherein the target resolution determining unit is configured to, when a screen resolution of the first display is lower than a screen resolution of the second display, determine the target resolution such that the plurality of source images fit in the first display.

10. The image processing apparatus according to claim 9, further comprising a background image composition unit configured to synthesize a background image with an image outputted from the image composition unit,
- wherein the second display is configured to display the image synthesized with the background image by the background image composition unit.

11. The image processing apparatus according to claim 9, further comprising a second resolution converting unit configured to convert a resolution of an image outputted from the image composition unit,
- wherein the second resolution converting unit is configured to convert the image outputted from the image composition unit into a resolution corresponding to the screen resolution of the second display.

12. An image processing method for displaying an image obtained by synthesizing a plurality of source images on first and second displays of different control units of backlights during local dimming control, the image processing method comprising:
- obtaining a first horizontal direction size and a first vertical direction size that are a horizontal direction size and a vertical direction size of the control unit of the backlight of the first display;
- obtaining a second horizontal direction size and a second vertical direction size that are a horizontal direction size and a vertical direction size of the control unit of the backlight of the second display;
- obtaining a resolution of each of the plurality of source images;
- determining a target resolution of the plurality of source images based on the first horizontal direction size, the first vertical direction size, the second horizontal direction size and the second vertical direction size;
- converting a resolution of each of the plurality of source images such that the resolution of each of the plurality of source images becomes the target resolution; and
- synthesizing each of the plurality of converted source images, and outputting the synthesized image to the first and second displays.

13. The image processing method according to claim 12, further comprising:
- determining a target resolution in a horizontal direction of the plurality of source images such that a resolution in the horizontal direction of each of the plurality of source images becomes a common multiple of the first horizontal direction size and the second horizontal direction size; and
- determining a target resolution in a vertical direction of the plurality of source images such that a resolution in the vertical direction of each of the plurality of source images becomes a common multiple of the first vertical direction size and the second vertical direction size.

14. The image processing method according to claim 13, further comprising determining an arrangement of the plurality of source images such that a boundary in the horizontal direction between the plurality of source images is at a position corresponding to the common multiple of the first horizontal direction size and the second horizontal direction size, and a boundary in the vertical direction between the plurality of source images is at a position corresponding to the common multiple of the first vertical direction size and the second vertical direction size.

* * * * *